US011129194B2

(12) United States Patent
Lou et al.

(10) Patent No.: US 11,129,194 B2
(45) Date of Patent: Sep. 21, 2021

(54) METHOD AND SYSTEM FOR SOUNDING AND CHANNEL SELECTION

(71) Applicant: InterDigital Patent Holdings, Inc., Wilmington, DE (US)

(72) Inventors: Hanqing Lou, Syosset, NY (US); Xiaofei Wang, Cedar Grove, NJ (US); Oghenekome Oteri, San Diego, CA (US); Robert L. Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 16 days.

(21) Appl. No.: 15/309,969

(22) PCT Filed: May 8, 2015

(86) PCT No.: PCT/US2015/030012
§ 371 (c)(1),
(2) Date: Nov. 9, 2016

(87) PCT Pub. No.: WO2015/172098
PCT Pub. Date: Nov. 12, 2015

(65) Prior Publication Data
US 2017/0273112 A1    Sep. 21, 2017

Related U.S. Application Data

(60) Provisional application No. 61/991,213, filed on May 9, 2014.

(51) Int. Cl.
*H04W 74/08* (2009.01)
*H04W 84/12* (2009.01)

(52) U.S. Cl.
CPC ........ *H04W 74/0825* (2013.01); *H04W 84/12* (2013.01)

(58) Field of Classification Search
None
See application file for complete search history.

(56) References Cited

U.S. PATENT DOCUMENTS

| 2008/0153506 A1* | 6/2008 | Yin | ................ H04L 1/0026 455/452.2 |
| 2010/0080173 A1* | 4/2010 | Takagi | ............. H04L 27/0006 370/328 |

(Continued)

FOREIGN PATENT DOCUMENTS

| EP | 1617598 A1 * | 1/2006 | ............ H04W 16/10 |
| WO | 2015/050995 | 4/2015 | |

OTHER PUBLICATIONS

IEEE Draft Standard for Information Technology—Telecommunications and information exchange between systems—Local and metropolitan area networks—Specific requirements; Part 11: Wireless LAN Medium Access Control (MAC) and Physical Layer (PHY) specifications, Amendment 4: TV White Spaces Operation, IEEE P802.11af™/D1.04 (Oct. 2011).

(Continued)

*Primary Examiner* — Jamaal Henson
(74) *Attorney, Agent, or Firm* — Volpe Koenig

(57) ABSTRACT

Methods and apparatus may be used for sounding for multi-user (MU) scheduling and for signaling and procedures for sub-channel selection. A wireless transmit/receive unit (WTRU) may receive information from an access point (AP) indicating a plurality of sub-channels to use for uplink data transmission as part of uplink MU wireless communications using a carrier sense multiple access (CSMA) wireless medium. The WTRU may transmit, using a plurality of sub-channels, a Physical Layer Convergence Protocol (PLCP) Protocol Data Unit (PPDU) including a preamble portion and a data portion, and, using at least a subset of the plurality of sub-channels, sounding signals to the AP for (Continued)

scheduling MU communications. The AP may receive sounding information from more WTRUs that the plurality of WTRUS associated with the scheduling information for the uplink data transmission during a time interval, in addition to receiving uplink data from the plurality of WTRUs.

16 Claims, 25 Drawing Sheets

(56) References Cited

U.S. PATENT DOCUMENTS

| | | | |
|---|---|---|---|
| 2010/0260060 A1* | 10/2010 | Abraham | H04W 28/18 370/252 |
| 2010/0309834 A1* | 12/2010 | Fischer | H04B 7/0452 370/312 |
| 2010/0322166 A1* | 12/2010 | Sampath | H04W 72/121 370/329 |
| 2010/0329236 A1 | 12/2010 | Sampath et al. | |
| 2011/0158159 A1* | 6/2011 | Gong | H04L 1/1621 370/328 |
| 2011/0235533 A1* | 9/2011 | Breit | H04L 1/0027 370/252 |
| 2012/0026909 A1* | 2/2012 | Seok | H04B 7/0417 370/252 |
| 2012/0120839 A1* | 5/2012 | Liu | H04L 1/0026 370/252 |
| 2012/0140753 A1* | 6/2012 | Lee | H04B 7/0636 370/338 |
| 2012/0250618 A1* | 10/2012 | Abraham | H04L 1/0039 370/328 |
| 2012/0263090 A1* | 10/2012 | Porat | H04L 1/06 370/312 |
| 2013/0170452 A1* | 7/2013 | Kwon | H04B 7/0456 370/329 |
| 2013/0188567 A1 | 7/2013 | Wang et al. | |
| 2013/0229996 A1 | 9/2013 | Wang et al. | |
| 2013/0250904 A1* | 9/2013 | Kang | H04B 7/0452 370/329 |
| 2013/0286959 A1* | 10/2013 | Lou | H04W 72/04 370/329 |
| 2013/0301551 A1 | 11/2013 | Ghosh et al. | |
| 2014/0056205 A1* | 2/2014 | Aboul-Magd | H04W 28/16 370/312 |
| 2014/0301208 A1* | 10/2014 | Merlin | H04L 1/0029 370/236 |
| 2015/0146807 A1* | 5/2015 | Zhang | H04W 4/08 375/260 |
| 2015/0146812 A1* | 5/2015 | Chu | H04W 72/0413 375/267 |
| 2016/0088641 A1* | 3/2016 | Kwon | H04W 72/085 370/329 |
| 2016/0233931 A1* | 8/2016 | van Zelst | H04B 17/12 |

OTHER PUBLICATIONS

IEEE Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6GHz, IEEE P802.11ac/D2.0 (Jan. 2012).

IEEE Draft Standard for Information Technology—Telecommunications and information exchange between systems—Local and metropolitan area networks—Specific requirements; Part 11: Wireless LAN Medium Access Control, (MAC) and Physical Layer (PHY) specifications, Amendment 5: TV White Spaces Operation, IEEE P802.11af™/D4.0 (Apr. 2013).

IEEE Draft Standard for Information technology—Telecommunications and information exchange between systems—Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah™/D5.0, Mar. 2015 (Mar. 2015).

IEEE P802.11ah/D1.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D1.0 (Oct. 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Draft P802.11-REVmb/D12 (Nov. 2011).

IEEE Standard for Information technology—Telecommunications and information exchange between systems Local and metropolitan area networks—Specific requirements; Part 11: Wireless LAN Medium Access Control (MAC) and Physical Layer (PHY) Specifications, Amendment 4: Enhancements for Very High Throughput for Operation in Bands below 6 GHz, IEEE Std 802.11ac™-2013 (Dec. 11, 2013).

Third Generation Partnership Project; "Technical Specification Group Radio Access Network; Evolved Universal Terrestrial Radio Access (E-UTRA); Physical channels and modulation (Release 12)," 3GPP TS 36.211 V12.1.0 (Mar. 2014).

Third Generation Partnership Project; "Technical Specification Group Radio Access Network; Evolved Universal Terrestrial Radio Access (E-UTRA); Physical channels and modulation (Release 12)," 3GPP TS 36.211 V12.5.0 (Mar. 2015).

* cited by examiner

METHOD AND SYSTEM FOR SOUNDING AND CHANNEL SELECTION

CROSS REFERENCE TO RELATED APPLICATION

This application is the U.S. National Stage, under 35 U.S.C. §371, of International Application No. PCT/US2015/030012 filed May 8, 2015, which claims the benefit of U.S. Provisional Application No. 61/991,213, filed May 9, 2014, which is incorporated by reference as if fully set forth.

BACKGROUND

A wireless local area network (WLAN) in Infrastructure Basic Service Set (BSS) mode may have an Access Point (AP) for the BSS and one or more stations (STAs) (also referred to herein as wireless transmit/receive units (WTRUs)) associated with the AP. The AP may access or interface to a Distribution System (DS) or another type of wired/wireless network that carries traffic in and out of the BSS. Traffic intended for WTRUs in the BSS that originates from outside the BSS may arrive through the AP and may be delivered to the WTRUs by the AP. Traffic originating from WTRUs in the BSS intended for destinations outside the BSS may be sent to the AP to be delivered to the respective destinations. Traffic between WTRUs within the BSS may be sent through the AP where the source WTRU may send traffic to the AP and the AP may deliver the traffic to the destination WTRU. Such traffic between WTRUs within a BSS may be referred to as peer-to-peer traffic. Peer-to-peer traffic may also be sent directly between the source and destination WTRUs with a direct link setup (DLS) using, for example, an 802.11e DLS or an 802.11z tunneled DLS (TDLS). A WLAN in Independent BSS (IBSS) mode may not have an AP such that WTRUs in the WLAN may communicate directly with each other. This mode of communication may be referred to as an ad-hoc mode of communication.

According to an Institute of Electrical and Electronic Engineers (IEEE) 802.11 infrastructure mode of operation, an AP may transmit a beacon on a fixed channel called the primary channel. This channel may be 20 MHz wide and may be the operating channel of the BSS. This channel may be used by the WTRUs to establish a connection with the AP.

SUMMARY

Methods and apparatus may be used for sounding for multi-user (MU) scheduling and for signaling and procedures for sub-channel selection in a IEEE 802.11 WLAN. A wireless transmit/receive unit (WTRU) may receive information from an access point (AP) indicating a plurality of sub-channels to use for uplink data transmission as part of uplink MU wireless communications using a carrier sense multiple access (CSMA) wireless medium. The WTRU may transmit, using a plurality of sub-channels, a Physical Layer Convergence Protocol (PLCP) Protocol Data Unit (PPDU) including a preamble portion and a data portion, and, using at least a subset of the plurality of sub-channels, sounding signals to the AP for scheduling MU communications. The AP may receive sounding signals from more WTRUs than the plurality of WTRUs associated with the scheduling information for the uplink data transmission during a time interval, in addition to receiving uplink data from the plurality of WTRUs during the time interval in accordance with the scheduling information.

BRIEF DESCRIPTION OF THE DRAWINGS

A more detailed understanding may be had from the following description, given by way of example in conjunction with the accompanying drawings wherein.

DETAILED DESCRIPTION

Figure 1A:
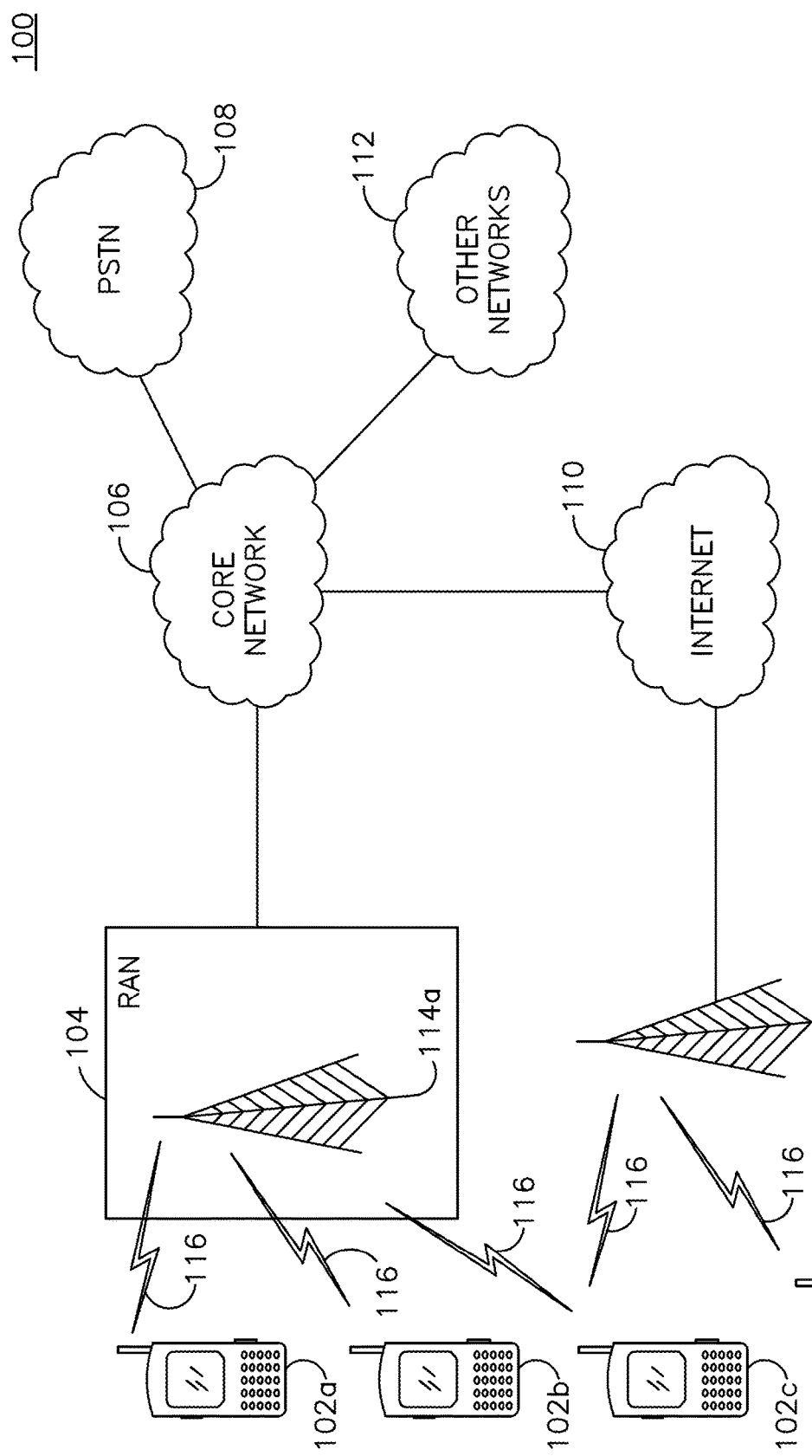
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
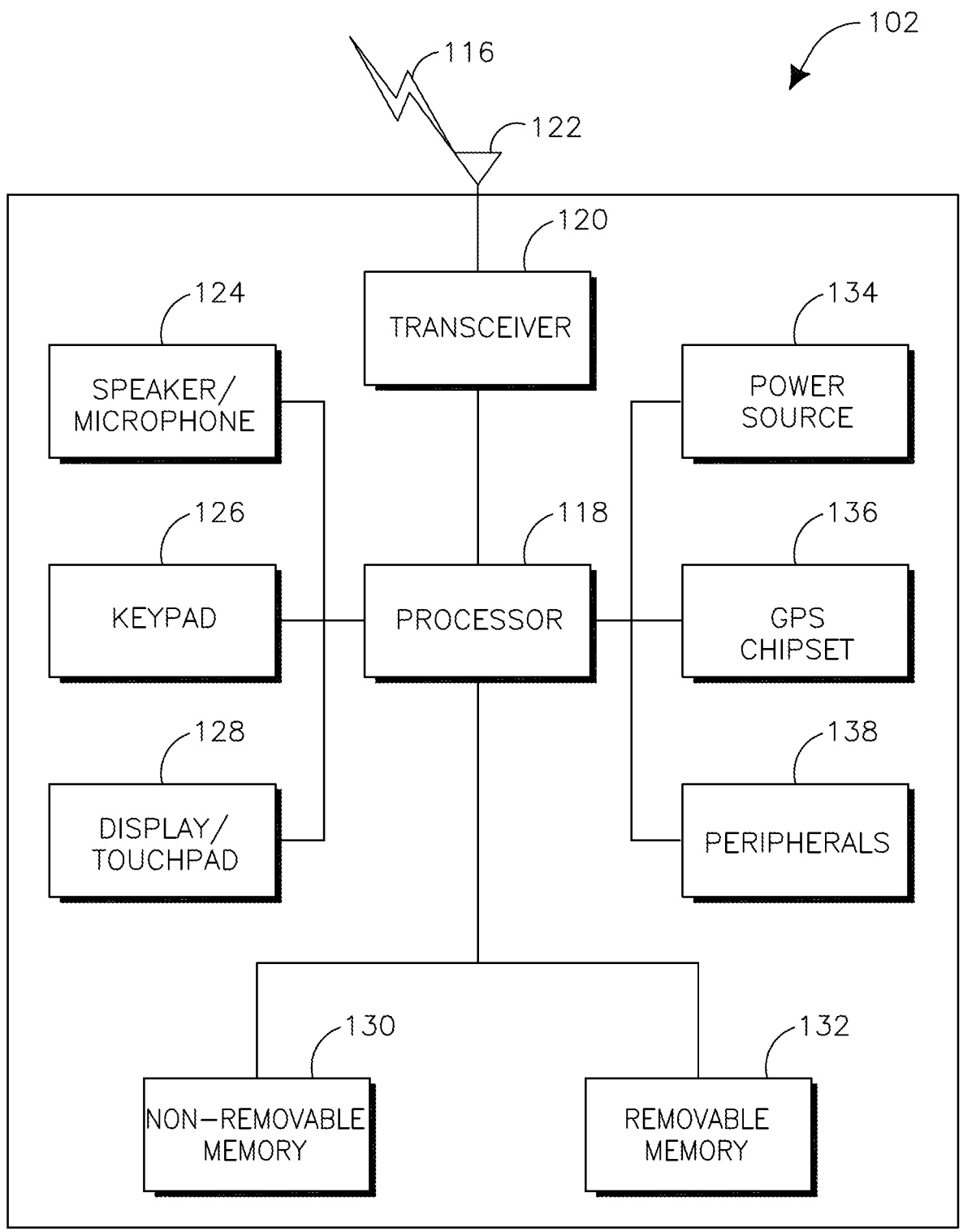
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
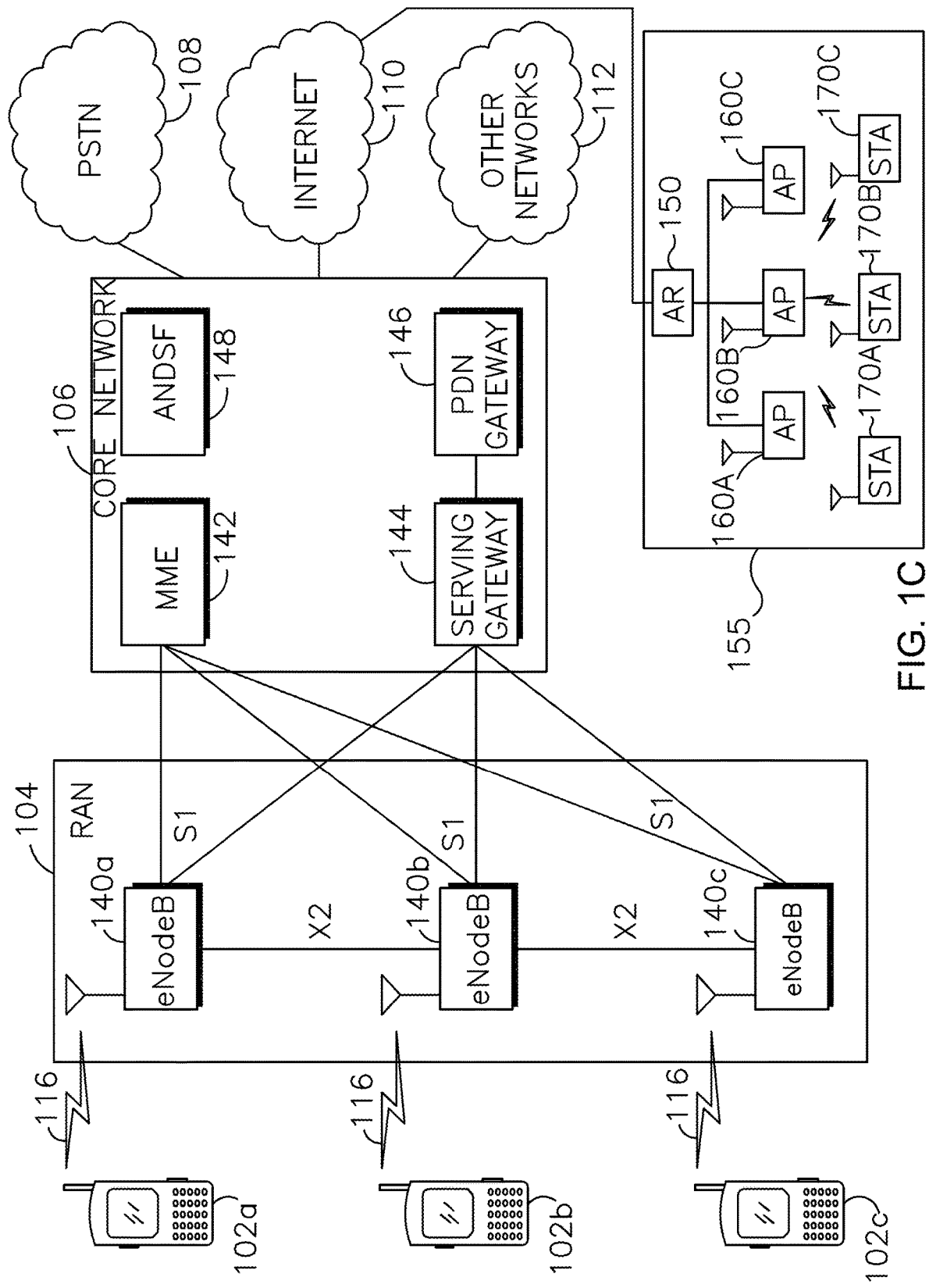
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of an IEEE 802.11 based wireless local area network (WLAN) 155 may be in communication with the Internet 110. The AR 150 may facilitate communications between APs 160a, 160b, and 160c. The APs 160a, 160b, and 160c may be in communication with stations (WTRUs) 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

An example of a WLAN is an IEEE 802.11 wireless communication system. As described herein, an IEEE 802.11 WLAN may also be referred to as WiFi network, which is a term for 802.11 compliant systems used by the industry consortium WiFi Alliance. A channel access mechanism used in an 802.11 system may be Carrier Sense Multiple Access with Collision Avoidance (CSMA/CA). In this mode of operation, every WTRU, including the AP, may sense the primary channel. If the primary channel is detected to be busy, the WTRU may refrain from transmitting on the wireless medium (also called backing off). This approach may provide that only one WTRU can transmit at any given time in a given BSS. When the WTRU senses the primary channel and determines the channel is not busy, the WTRU may then transmit on the wireless medium.

802.11n and 802.11ac systems may operate in frequencies from 2 to 6 GHz. In 802.11n, High Throughput (HT) WTRUs may use a 40 MHz wide channel for communication. For example, a primary 20 MHz channel may be combined with another 20 MHz channel (e.g. an adjacent channel) to form a 40 MHz wide channel. In 802.11ac, Very High Throughput (VHT) WTRUs may support 20 MHz, 40 MHz, 80 MHz and 160 MHz wide channels. For example, 40 MHz and 80 MHz channels may be formed by combining contiguous 20 MHz channels, similar to the example in 802.11n described above. In another example, a 160 MHz channel may be formed by combining 8 contiguous 20 MHz channels or two non-contiguous 80 MHz channels, which may be referred to as an 80+80 configuration.

As an example of operation in the 80+80 configuration, the data, after channel encoding, may be passed through a segment parser that may divide it into two streams. Inverse Fast Fourier Transform (IFFT) and time domain processing may be applied on each stream separately. The streams may be mapped onto two channels and the data may be sent out. At the receiver, this mechanism may be reversed and the combined data may be sent to the medium access control (MAC) layer.

The IEEE 802.11af and 802.11ah are being developed for operation in frequencies that may be less than 1 GHz. For 802.11af and 802.11ah, the channel operating bandwidths may be reduced as compared to 802.11n and 802.11ac. For example, 802.11af may support 5 MHz, 10 MHz and 20 MHz wide bands in TV White Space (TVWS) while 802.11ah may support 1 MHz, 2 MHz, 4 MHz, 8 MHz and 16 MHz in non-TVWS. Some WTRUs in 802.11ah may be sensors with limited capabilities and may only support 1 and 2 MHz transmission modes.

In WLAN systems that use multiple channel widths such as 802.11n, 802.11ac, 802.11af, and 802.11ah, there may be a primary channel that may have a bandwidth equal to the largest common operating bandwidth supported by all WTRUs in the BSS. Thus, the bandwidth of the primary channel may be limited by the WTRU that supports the smallest bandwidth operating mode. In the example of 802.11ah, the primary channel may be 1 or 2 MHz wide if there are WTRUs that only support 1 and 2 MHz modes, while the AP and other WTRUs in the BSS may support 4 MHz, 8 MHz and/or 16 MHz operating modes.

Carrier sensing and network allocation vector (NAV) settings may depend on the status (e.g. busy or idle) on the primary channel. For example, the primary channel may be busy due to a WTRU supporting 1 and 2 MHz operating modes transmitting to the AP. In this case, the entire available frequency bands may be considered busy, even though the majority of the frequency bands are idle and available. In 802.11ah and 802.11af, packets may be transmitted using a clock that is down clocked 4 or 10 times as compared to the 802.11ac operation.

In the United States, the available frequency bands that can be used for 802.11ah may be from 902 MHz to 928 MHz. In Korea, it may be from 917.5 MHz to 923.5 MHz; and in Japan, it may be from 916.5 MHz to 927.5 MHz. The total bandwidth available for 802.11ah may be 6 MHz to 26 MHz, depending on the country code.

To improve spectral efficiency, 802.11ac and/or 802.11ah may use downlink Multi-User MIMO (MU-MIMO) transmission to multiple WTRUs in the same symbol's time frame (e.g. during a downlink OFDM symbol). Downlink MU-MIMO, as it is used in 802.11ac, may use the same symbol timing to multiple WTRUs, such that interference of the waveform transmissions to multiple WTRUs may not be an issue. However, all WTRUs involved in MU-MIMO transmission with the AP may use the same channel or band, which may limit the operating bandwidth to the smallest channel bandwidth that is supported by the WTRUs that are included in the MU-MIMO transmission with the AP.

802.11ac may support communications using the entire available bandwidth for a particular resource allocation. Orthogonal frequency division multiple access (OFDMA) technologies may enable more efficient utilization of spectral resources and may be supported by the 802.16 WiMax and Third Generation Partnership Project (3GPP Long Term Evolution (LTE) communications protocols. 802.11ax may enhance the performance of 802.11ac, and may improve spectral efficiency, area throughput, and/or robustness to collisions and interference. Methods to address these needs for 802.11ax may include Coordinated Orthogonal Block-based Resource Allocation (COBRA), and Multi-User Parallel Channel Access (MU-PCA). These technologies may enable transmission over a smaller frequency-time resource unit than in 802.11ac. Thus, multiple users may be allocated to non-overlapping frequency-time resource unit(s), which may enable simultaneous transmission and reception on orthogonal frequency-time resources. This may allow the frequency-time resources to be more efficiently utilized, and may improve Quality of Service (QoS).

A sub-channel may be defined as a basic time-frequency resource unit that an AP may allocate to a WTRU. As an example, a sub-channel may be a 20 MHz channel, which may be backward compatible with 802.11n and/or 802.11ac.

A sub-channel may be a portion of a primary channel or may be a portion of a secondary channel.

The COBRA transmission scheme may be a means for WLAN medium access. The COBRA scheme may use a generic subcarrier based multiple access scheme. Solutions for COBRA may include multicarrier modulation, and filtering, with time, frequency, space, and polarization domains as the basis for the transmission and coding scheme.

For example, the COBRA scheme may be implemented using one or more of the following: OFDMA Sub-channelization, SC-FDMA Sub-channelization and/or Filter-Bank Multicarrier Sub-channelization. Examples features of the COBRA scheme may include, but are not limited to any of the following: methods for coverage range extension; methods of grouping users; methods for channel access; preamble designs for low overhead; methods for beamforming and sounding; methods for frequency and timing synchronization; and/or methods for link adaptation.

Methods for MU-PCA in WLAN systems may be related to COBRA by extending the solutions for multiple users. Example uses for MU-PCA may include multi-user and/or single-user parallel channel access using transmit/receive with symmetrical bandwidth. This channel access may include one or more of the following: downlink parallel channel access for multiple/single users; uplink parallel channel access for multiple/single users; combined downlink and uplink parallel channel access for multiple/single users; design to support unequal modulation and coding scheme (MCS) and unequal transmit power for single-user parallel channel access (SU-PCA) and MU-PCA; physical (PHY) layer designs and procedures to support MU/SU-PCA using transmit/receive with symmetrical bandwidth; and/or mixed MAC/PHY MU-PCA.

Example uses for MU-PCA may also include MU/SU-PCA transmit/receive with asymmetrical bandwidth. This channel access may include at least one of the following: MAC designs and procedures for downlink, uplink and combined uplink and downlink for MU/SU-PCA using transmit/receive with asymmetrical bandwidth; and PHY designs and procedures to support MU/SU-PCA using transmit/receive with asymmetrical bandwidth.

Sounding mechanisms may be defined for link adaptation, beamforming and/or antenna selection. For example, sounding Physical Layer Convergence Protocol (PLCP) Protocol Data Units (PPDUs) and/or Null Data Packets (NDPs) may be used sounding purposes. A physical layer frame format may be used for sounding PPDUs, which may include for example: sounding with an NDP; a sounding PPDU for calibration; and/or a sounding PPDU for channel quality assessment.

Figure 2:
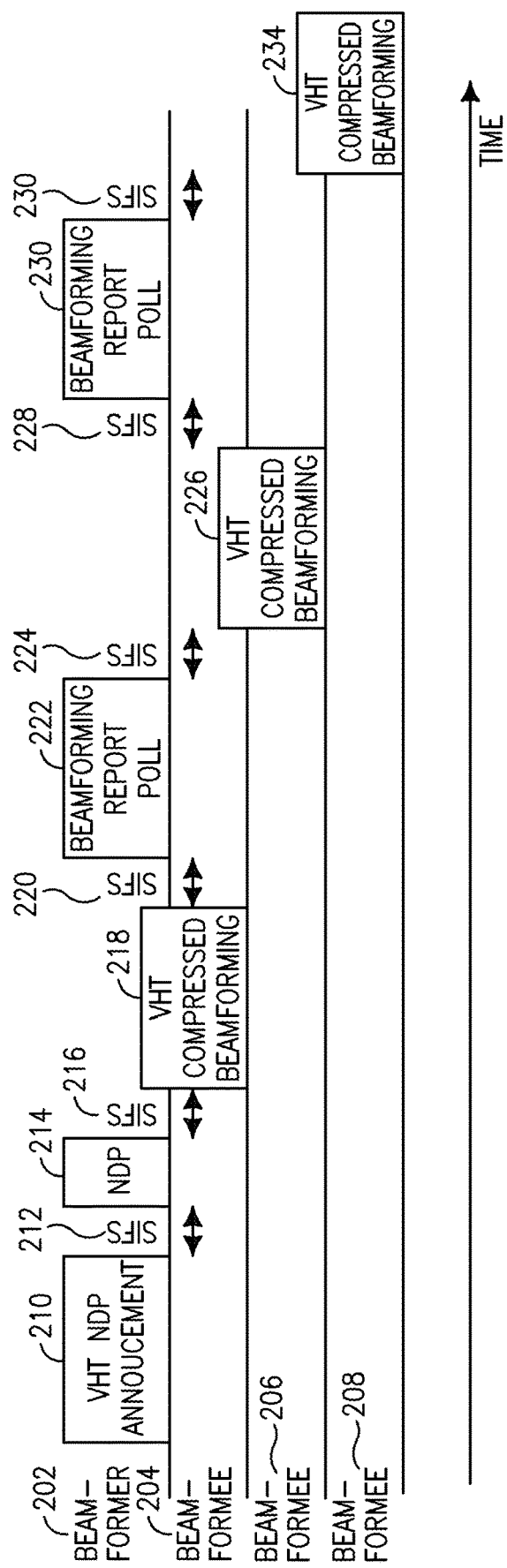
FIG. 2 is a diagram of an example of the sounding protocol with more than one Very High Throughput (VHT) beam formed.

According to an example, two types of sounding PPDUs may be defined: a "regular" PPDU and an NDP PPDU. A regular PPDU may be a PPDU with extra-long training fields that may be used for sounding. An NDP PPDU may carry training fields and the SIG field only. 802.11ac simplified the sounding mechanisms defined in 802.11n by only using the NDP sounding frames. FIG. 2 is a signaling diagram of an example sounding procedure 200 for downlink MU-MIMO transmissions. A beamformer 202, which may be an AP, may send out a VHT NDP Announcement (NDPA) 210 followed by an NDP PPDU 214 for sounding to multiple beamformees 204, 206 and 208. The beamformees 204, 206, and 208 may be non-AP STAB, for example.

The beamformees 204, 206 and 208 may receive the NDP PPDU 214 and measure the channel accordingly. In this example, beamformee 204 may respond to the beamformer 202 with a VHT compressed beamforming report 218, which may include channel state information of the beamformee 204. Beamformer 202 may poll beamformee 206 by sending a beamforming report poll 222, to which beamformee 206 may respond with its VHT compressed beamforming message 226. Beamformer 202 may send another beamforming report poll 230, to which beamformee 208 may respond with a VHT compressed beamforming message 234. Once the beamformer 202 receives all the channel state information from all of the beamformees 204, 206, 208, the beamformer 202 may begin DL MU-MIMO transmission, based on received channel state information from all of the beamformees 204, 206, and 208, such that the beamformer 202 may transmit concurrently to the beamformees 204, 206, 208. As shown in FIG. 2, message transmissions may be separated by SIFSs 212, 216, 220, 224, 228 and/or 232.

According to teachings herein, sounding mechanisms may be used for multi-user scheduling. Sounding mechanisms may support the multiple user case, and may accommodate multiple users in the spatial domain and/or frequency domain. Sounding mechanisms may sound sub-channels and/or the entire channel. An independent NDP PPDU may be used for sounding, and may use a channel access scheme (for example, competing for the CSMA wireless channel and backing off if the channel is busy before transmitting), which may not be efficient. A sounding packet may include a normal PPDU with extra training fields, for example in 802.11n, and may be used for a single user to sound the entire bandwidth or may be used for multiple users to sound one or more sub-channels. Estimating the channel in a multi-user transmission scenario may incur high overhead. The teachings herein may limit the overhead of sounding the channel for the case of multiple uplink transmissions from the WTRUs.

In order to achieve an improved peak throughput, the 802.11ac protocol may use transmissions over a wideband channel, for example 80 MHz and/or 160 MHz (80+80) channels, as described above. A wideband channel may have frequency selective characteristics. For example, interference from other WiFi signals, and non-WiFi signals, over a partially overlapping channel, or a narrow band channel, may contribute to the frequency selectivity of the channel. The wideband channels in 802.11ac may exhibit characteristics that may be beneficial to some users on some sub-channels, but not to others. Other WiFi systems may employ even wider bandwidths that those used in 802.11ac, which may suffer more from frequency selectivity issues.

According to the teachings herein, the AP and associated WTRUs may support multi-user sub-channel selection, for example by using a known channel metric, such that multi-user and frequency diversity may be achieved. Methods and systems may enable the exchange of channel metrics between the transmitting and receiving WTRUs. This may include the definition of feedback signaling and associated procedures for the support of this signaling, while maintaining backward compatibility with legacy devices.

Sounding mechanisms may be used for multi-user scheduling. A sounding signal may be used for multi-user scheduling, for example link adaptation and/or sub-channel selection, for a future COBRA transmission. For example, procedures and frame formats may enable multi-user sounding signals to be transmitted with the uplink (UL) COBRA packet. Rules for sounding signals that may be transmitted with the UL COBRA packet are described below. Procedures for transmitting sounding signals with inter-frame space (IFS) and procedures for transmitting sounding signals without IFS are described below. Procedures for transmitting sounding signals with a COBRA channel access scheme and multi-user sounding capability fields are also described below.

Rules that may be used for sounding signals in the uplink are described herein. According to an embodiment, the sounding signals (e.g. long training field (LTF) sequence) may be transmitted with the UL COBRA packet. Based on the COBRA scheduling, user(s) may transmit data on the allocated sub-channel(s). The same users or different users may transmit a sounding signal over the entire band or a subset of the entire band. For example, this subset of the entire band may be a secondary channel or ternary channel.

The COBRA scheduling frame may be transmitted in the primary channel. The COBRA scheduling frame may include parameters and fields that indicate one or more of the following information: the position of the sounding signal, which may indicate that the sounding signals may be sent before and/or after the data is transmitted; the order in which the sounding signals are sent from each of the WTRUs, such that the order may be implicitly decided based on the order of the WTRUs in frequency, for example, which may limit the WTRUs to be sounded to the WTRUs that are scheduled; the order in which the sounding signals are sent from each of the WTRUs may be explicit signaled in the COBRA scheduling frame where each WTRU to be scheduled has an additional field indicating its sounding frame order; the order in which the sounding signals are sent from each of the WTRUs may be explicitly signaled in the COBRA scheduling frame with additional fields indicating the WTRUs to send their sounding frames and their order (this may allow flexibility in sounding as the WTRUs that are scheduled are not necessarily the same WTRUs that send their sounding frames); and, in the case that multiple antennas are used at the WTRU that plans to transmit a sounding frame, a sounding sequence may be transmitted multiple times to sound multiple antennas.

According to an embodiment, the sounding signals from each of the WTRUs may be separated by an inter-frame spacing (xIFS) from the data signal. They may be separated in time, frequency and/or code from each other with xIFS between them, as needed. The xIFS may be present so that a new channel access procedure may not be needed during the sounding process. In this case, the channel reservation duration may include the time period for the additional sounding packets. Sounding information may be piggy-backed on the COBRA poll response frame instead of or in addition to using the data frame for sounding.

The following examples of multi-user sounding shown in FIG. 3 through FIG. 12 are for sounding by multiple WTRUs (e.g. four WTRUs: WTRU1, WTRU2, WTRU3, WTRU4), such that the techniques may apply to any number of WTRUs in a multi-user system.

Figure 3:
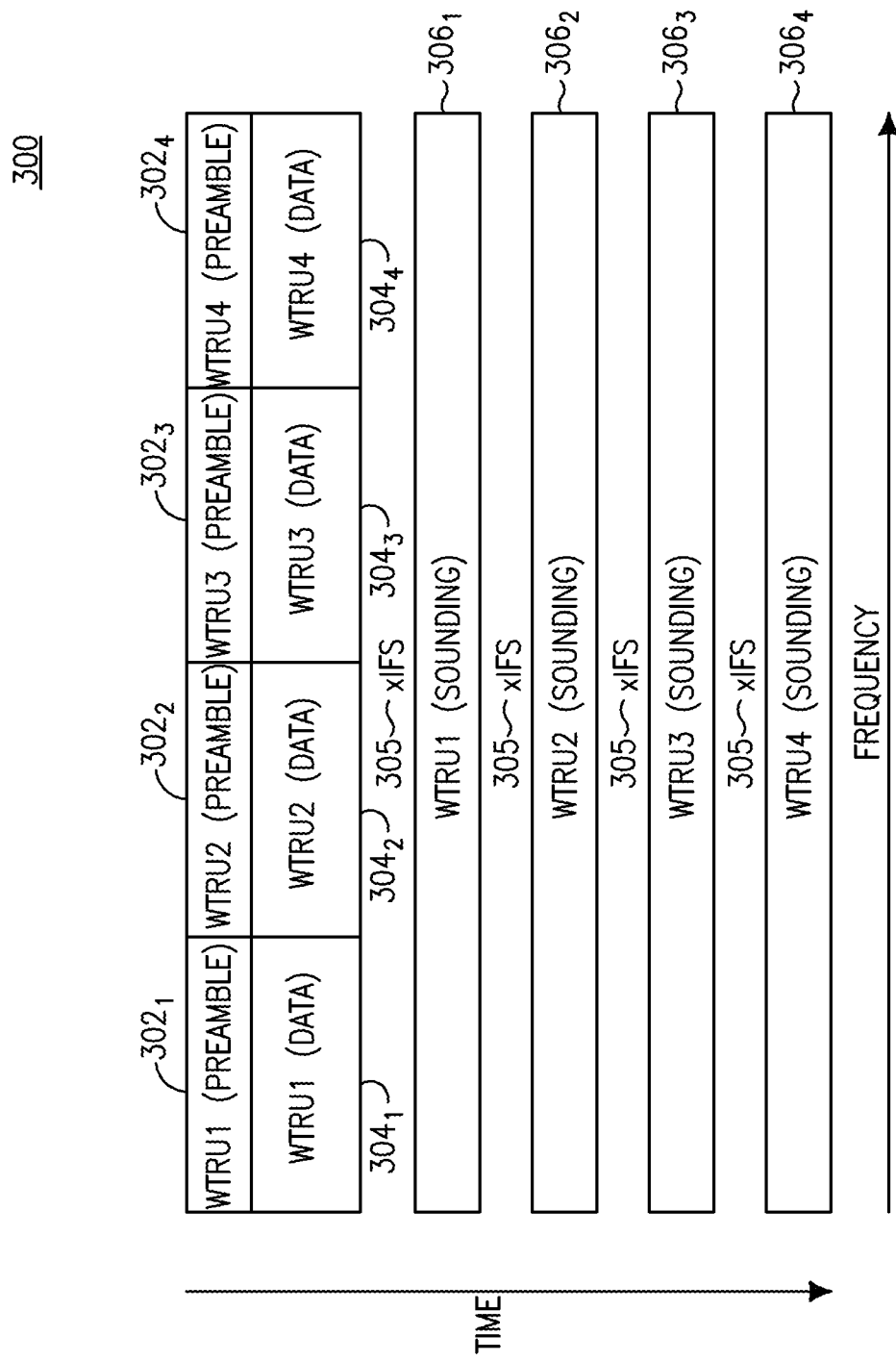
FIG. 3 shows an example multi-user sounding procedure with time domain separation, inter-frame spacing (xIFS) and sounding after the data frame(s)

FIG. 3 shows an example multi-user sounding procedure 300 with time domain separation and sounding after the data frame(s). According to the example of FIG. 3, the multi-user sounding signals $306_1$-$306_4$, transmitted by WTRU1-WTRU4 respectively, may be separated in the time domain by xIFSs 305. Sounding signals $306_1$-$306_4$ may be transmitted after transmission of data frames $304_1$-$304_4$, including preambles $302_1$-$302_4$. Each WTRU (WTRU1-WTRU4) may send its own sounding packets $306_1$-$306_4$ across the entire frequency band separated by time with an xIFS 305 between each of the sounding signals $306_1$-$306_4$. For example, the xIFSs 305 may be a SIFS to prevent any other packet from transmitting during the quiet periods, as is well known in WLAN systems. This embodiment allows full frequency band sounding by all WTRUs WTRU1-WTRU4 during the same transmission opportunity as an uplink MU-MIMO transmission by all WTRUs WTRU1-WTRU4.

Figure 4:
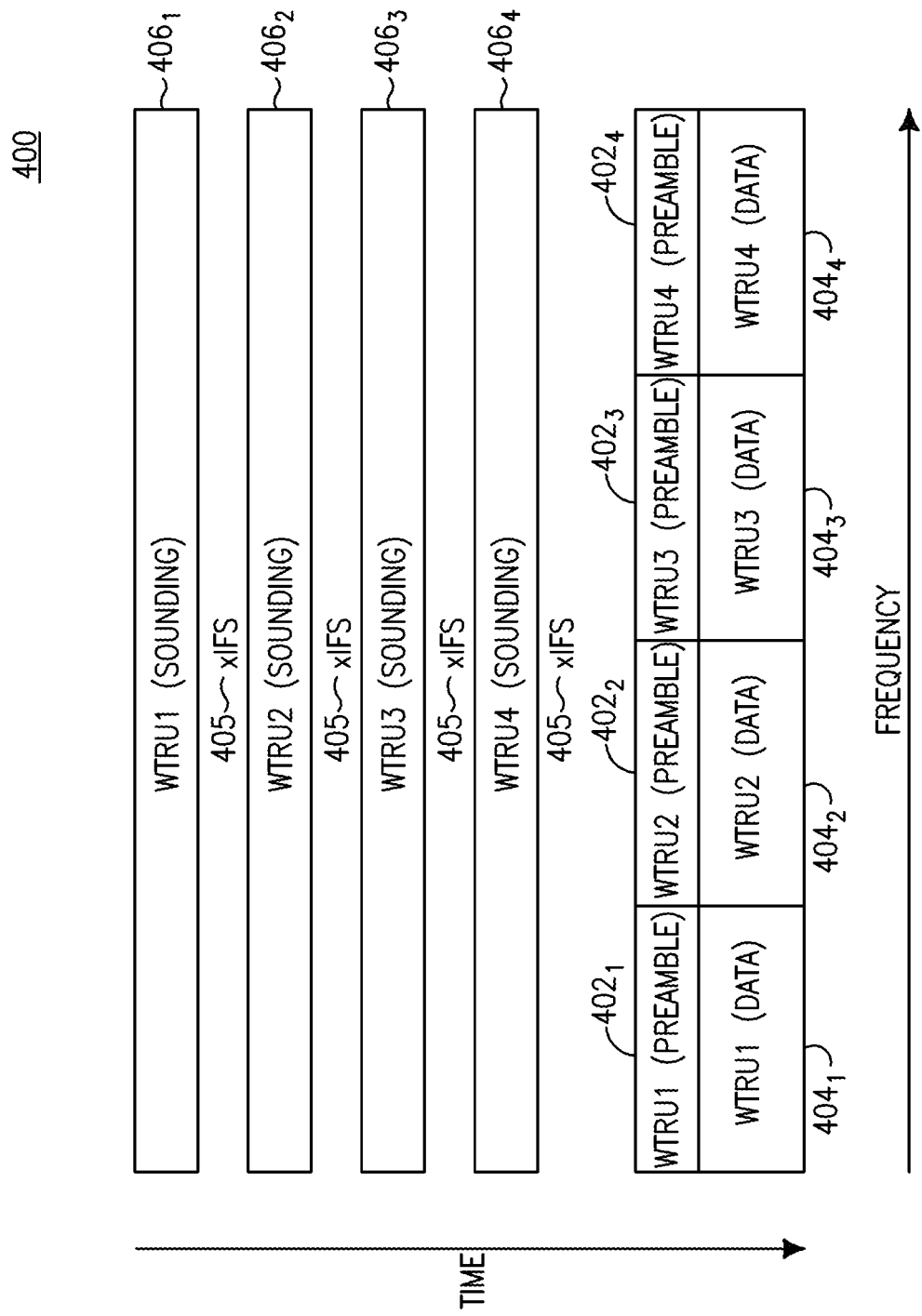
FIG. 4 shows an example multi-user sounding procedure with time domain separation, xIFS and sounding before the data frame(s)

FIG. 4 shows an example multi-user sounding procedure 400 with time domain separation and sounding before transmission of data frame(s). According to the example of FIG. 4, the multi-user sounding signals $406_1$-$406_4$, transmitted by WTRU1-WTRU4 respectively, may be separated in the time domain by xIFS 405. Sounding signals $406_1$-$406_4$ may be transmitted before transmission of data frames $404_1$-$404_4$, including preambles $402_1$-$402_4$. Each WTRU (WTRU1-WTRU4) may send its own sounding packets $406_1$-$406_4$ across the entire band separated by time with an xIFS 405 between each of the sounding signals $406_1$-$406_4$. For example, the xIFS 405 may be a SIFS to prevent any other packet from transmitting during the quiet periods. This embodiment also allows full frequency band sounding by all WTRUs WTRU1-WTRU4 during the same transmission opportunity as an uplink MU-MIMO transmission by all WTRUs WTRU1-WTRU4.

In the examples of FIGS. 3 and 4, the WTRUs WTRU1-WTRU4 may send sounding packets on a secondary subchannel. Also, the sounding packets transmitted from WTRUs may be an NDP over the entire bandwidth, and may include short training field (STF), long training field (LTF) and/or signaling field (SIG). The SIG field may explicitly signal the transmitter of the NDP packet, for example, in the case that a COBRA schedule frame has implicitly or explicitly indicated the order of the sounding frames that are transmitted before or after uplink COBRA transmission (e.g. COBRA data transmissions or COBRA poll response transmissions). The sounding frame may be shortened to include only STF and LTF in this scenario.

Figure 5:
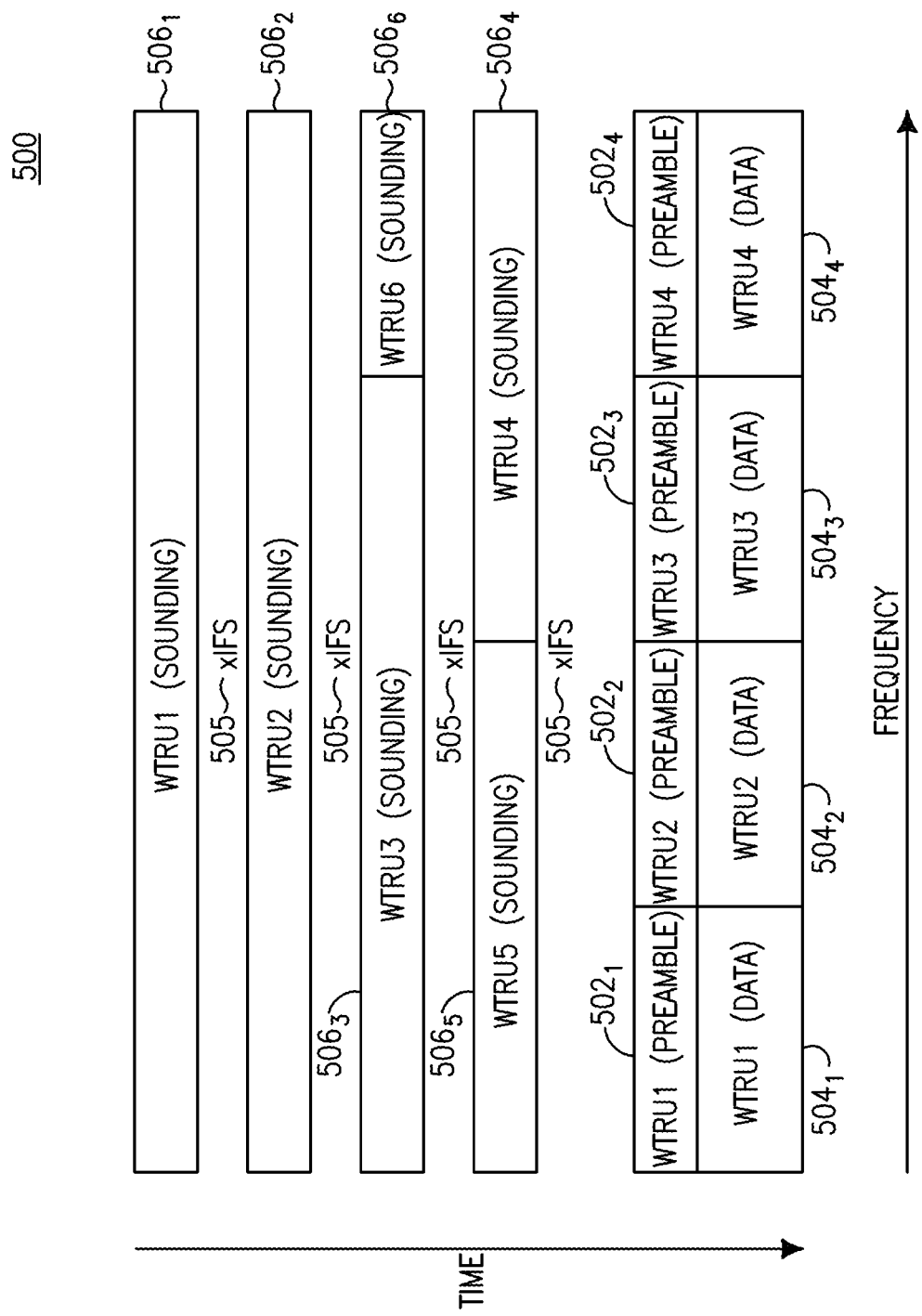
FIG. 5 shows an example multi-user sounding procedure with time and frequency domain separation, xIFS and sounding before the data frame(s)

FIG. 5 shows an example multi-user sounding procedure 500 with time and frequency domain separation and sounding before the data frame(s). In the example of FIG. 5, xIFS 505 may be used to separate the multi-user sounding signals $506_1$-$506_4$. In this case, WTRU1-WTRU4 may be scheduled for uplink COBRA transmissions, while WTRU5 and WTRU6 may transmit sounding packets $506_5$-$506_6$, respectively, in time intervals as shown. Sounding signals $506_1$-$506_4$ may be transmitted before transmission of data frames $504_1$-$504_4$, including preambles $502_1$-$502_4$. The sounding packets $505_1$-$506_6$ transmitted from all of the WTRUs (WTRU1-WTRU6 in this example) may be NDPs, and may include STF, LTF and/or SIG fields. The SIG field may be redefined to explicitly signal the transmitter of the NDP packet. This may be optional if for example COBRA schedule frame has implicitly or explicitly indicate the order of the sounding frames. The sounding frame may be shortened to include only STF and LTF in this scenario.

The COBRA control frame that schedules the sounding transmissions may indicate the frequency-time resource(s) utilized for sounding for each WTRU. In the case of multiple antennae, a COBRA AP may schedule two WTRUs that have the same number of transmit antennas to share one time slot. For example, with reference to FIG. 5, WTRU3 and WTRU6 may be scheduled to transmit over the entire channel but share a time interval in time to transmit sounding signals $506_3$ and $506_6$ over a portion of the frequency band, and similarly WTRU4 and WTRU5 may be scheduled to transmit over the entire channel but share a time interval to transmit sounding signals $506_4$ and $506_5$, respectively, over a portion of the frequency band. WTRUs that share the same time slot may have a different number of transmit antennas. In an example, all the WTRUs may transmit sounding sequence N times, where N is the maximum number of antennas of the WTRUs.

Figure 6:
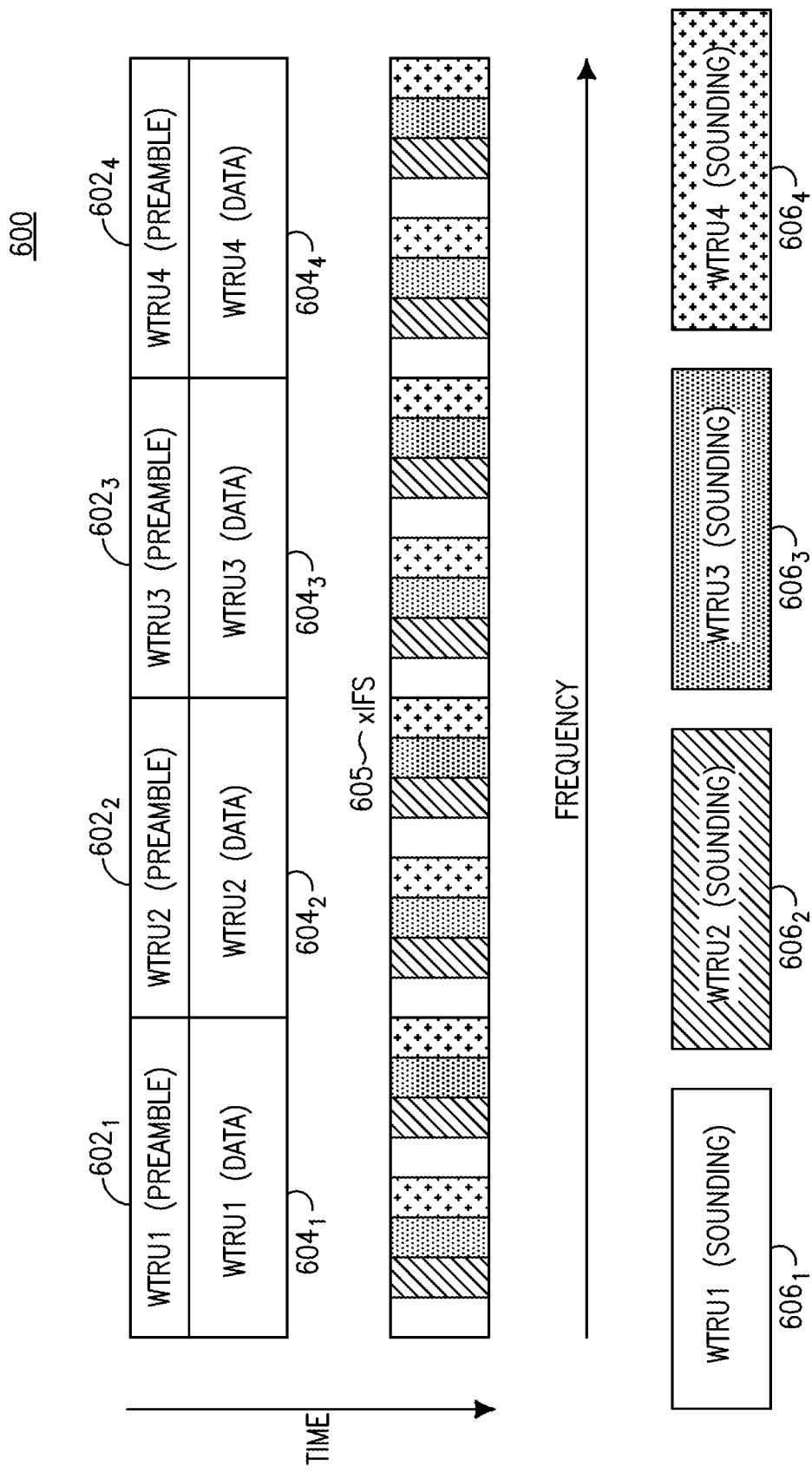
FIG. 6 shows an example frequency-interleaved multi-user sounding procedure with xIFS and sounding after the data frame(s)

FIG. 6 shows an example frequency-interleaved multi-user sounding procedure 600 with xIFS and sounding after the data frame(s). A subset of the WTRUs WTRU1-WTRU4 may simultaneously send their sounding signals $606_1$-$606_4$ across the entire frequency band separated and/or interleaved in frequency. Sounding signals $606_1$-$606_4$ may be transmitted after transmission of data frames $604_1$-$604_4$, including preambles $602_1$-$602_4$, and may be separated by xIFS 605. This embodiment allows wideband sounding of the frequency band by all of the WTRUs WTRU1-WTRU4 in a single time interval.

Figure 7:
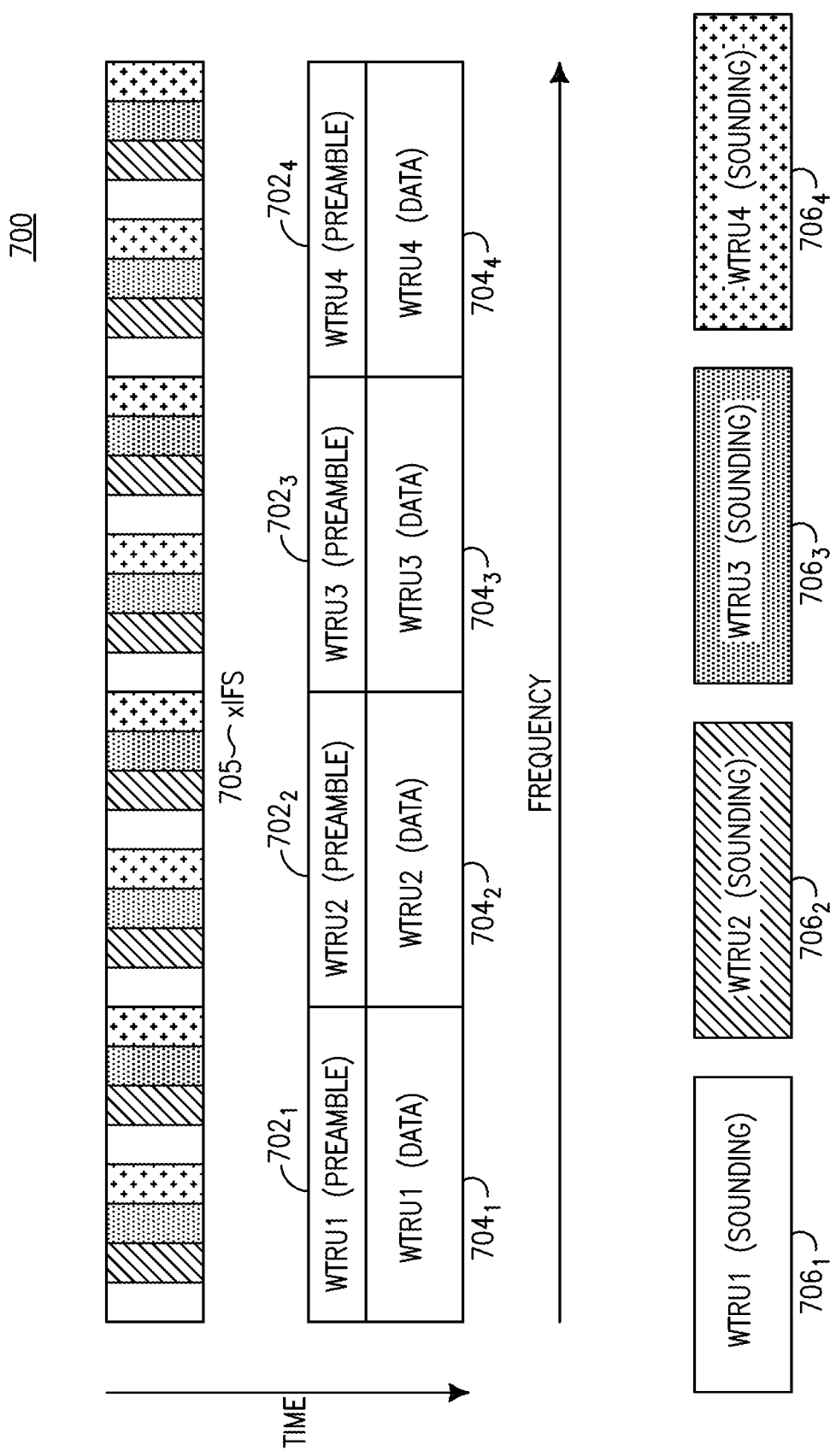
FIG. 7 shows an example frequency-interleaved multi-user sounding procedure with xIFS and sounding before the data frame(s)

FIG. 7 shows an example frequency-interleaved multi-user sounding procedure 700 with xIFS and sounding before the data frame(s). A subset of the WTRUs WTRU1-WTRU4 may simultaneously send their sounding signals $702_1$-$702_4$ across the entire frequency band separated and/or interleaved in frequency. Sounding signals $706_1$-$706_4$ may be transmitted before transmission of data frames $704_1$-$704_4$, including preambles $702_1$-$702_4$, and may be separated by xIFS 705. This embodiment also allows wideband sounding of the frequency band by all of the WTRUs WTRU1-WTRU4 in a single time interval.

In the embodiments shown in FIGS. 6 and 7, the xIFS may be a SIFS to prevent any other packet from transmitting during the quiet periods. In this case, the AP may have to interpolate the received signal from each WTRU to estimate the entire channel and time and frequency synchronization may be needed. This is because each WTRU1-WTRU4 may only be sounded in a portion of the entire frequency band. The overhead in this case may be reduced as compared to the time-domain separation methods described above.

As shown in FIGS. 6 and 7, a separately transmitted sounding packet may be defined. This packet may include a sounding sequence only. The sequence may be specially defined with good correlation characteristics, such as an LTF-like sequence. WTRUs that are transmitting sounding signals in a frequency interleaved format may transmit only symbols of the sequence that are located in the assigned subcarriers. For example, WTRU1 may transmit on subcarrier {k, k+4, k+8, etc.} and WTRU4 may transmit on subcarrier {k+3, k+7, k+11, etc.}. In this way, the receiver may observe one OFDM symbol with the whole sequence.

When WTRUs have multiple transmit antennas, they may transmit sounding signals on a subset of sub-carriers in different time interval(s) and/or OFDM symbol(s), where the subset of sub-carriers may or may not be fixed. For example, each antenna may have a subset of sub-carriers that may be shifted from the base subset allocated to the first antenna. For example, WTRU1 may have two antennas. Antenna 1 of WTRU1 may transmit sounding signals on subcarrier {k, k+4, k+8, etc.} of OFDM symbol M, and antenna 2 of WTRU1 may transmit sounding signals on subcarrier {k+1, k+5, k+9, etc.}.

The transmit power of the sounding signals may be set to a level different from the transmit power of the data signals in the cases that they are separate packets. In cases where there are multiple WTRUs transmitting sounding packets at the same time, the transmit power of the multiple WTRUs may be set to ensure that the sounding packets arrive at about the same power at the AP to reduce the peak-to-average power ratio seen by the receiver, which may ease the design of the Automatic Gain Control (AGC) and/or Analog to Digital Converters (ADCs).

In the following examples shown in FIGS. 8-12, the sounding signals from each of the WTRUs (WTRU1-

WTRU4) may not be separated by any inter-frame spacing (xIFS) from the data signal, which may reduce the overhead. In these cases, the WTRUs may construct the data packets and sounding packets simultaneously and send the data and sounding packets to the AP. The sounding packets may also be separated in time, frequency and/or code from each other.

Figure 8:
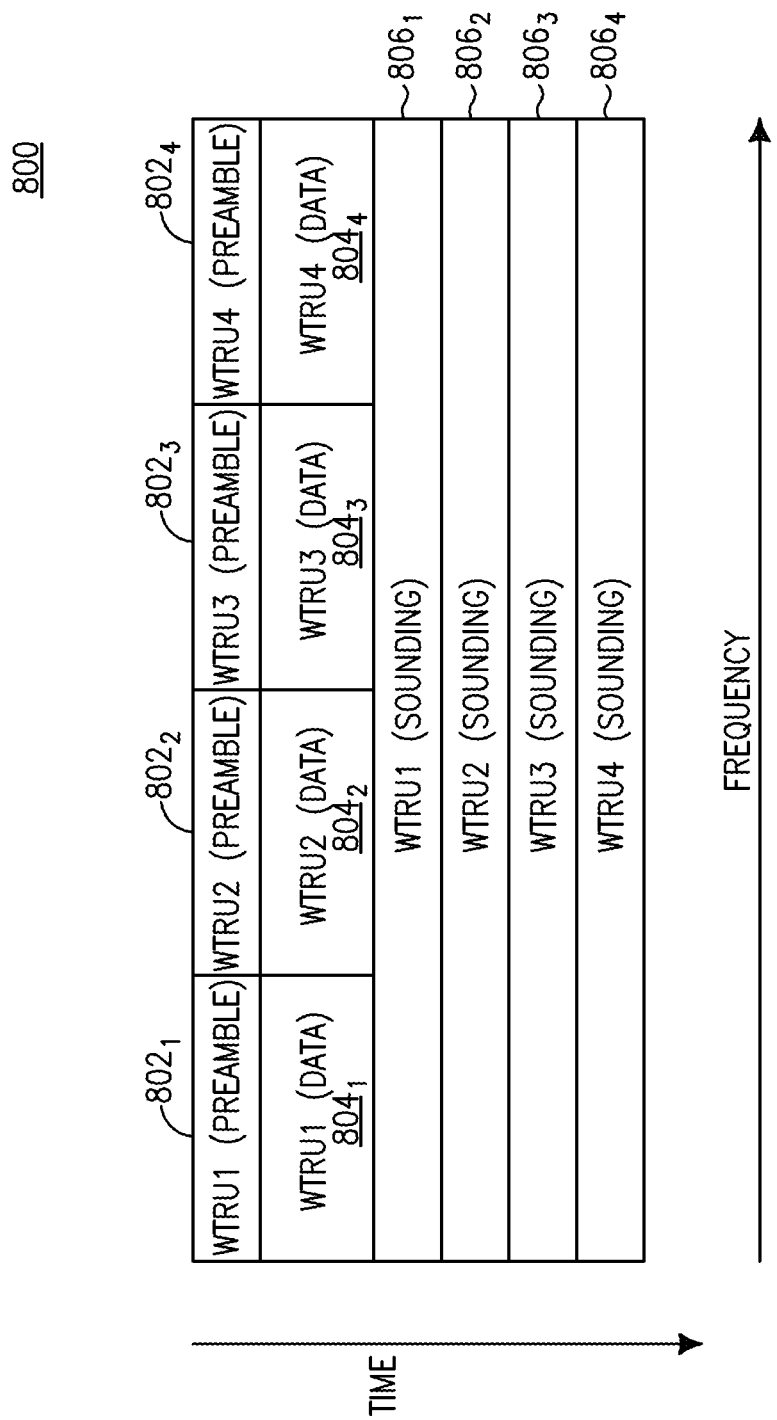
FIG. 8 shows an example multi-user sounding procedure with time domain separation, no xIFS and sounding after the data frame(s)

FIG. 8 shows an example multi-user sounding procedure 800 with time domain separation, no xIFS and sounding after the data frame(s). Each WTRU (WTRU1-WTRU4) may send its own sounding packets $806_1$-$806_4$ across the entire frequency band separated in time, one after another, and the sounding signals $806_1$-$806_4$ may be sent after transmission of respective data packet $804_1$-$804_4$, including preambles $802_1$-$802_4$, which are transmitted in an UL MU transmission.

Figure 9:
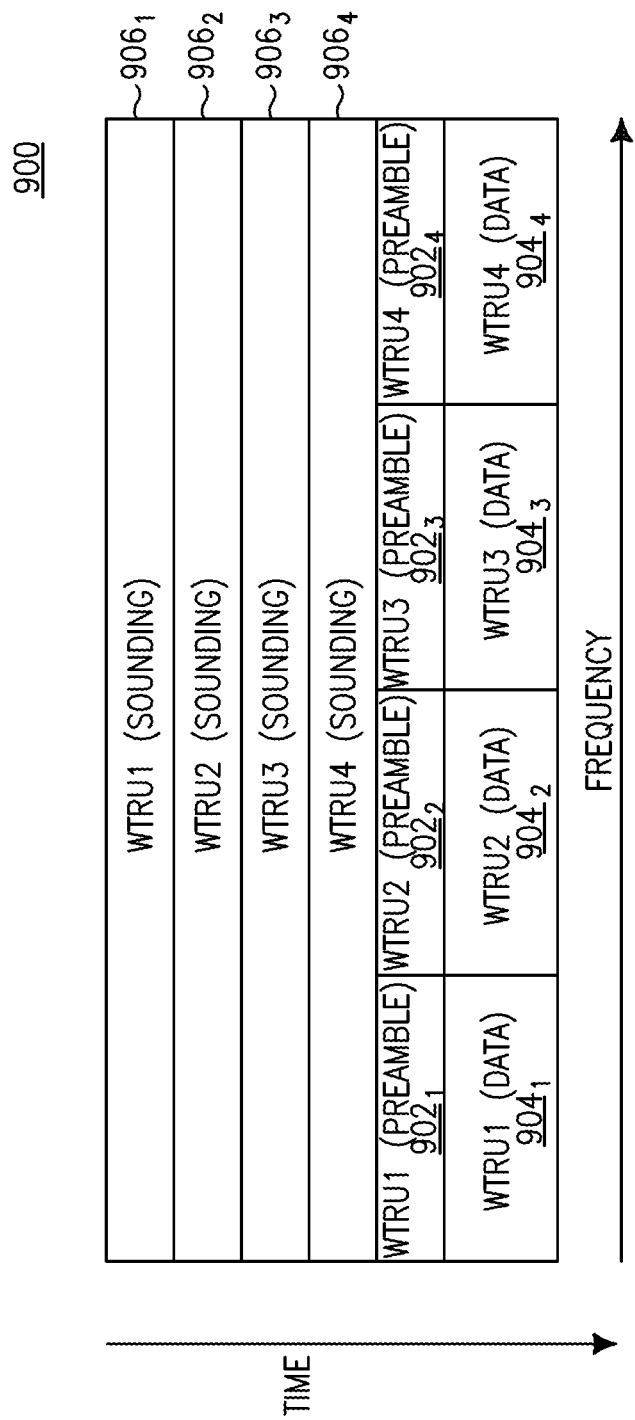
FIG. 9 shows an example multi-user procedure a diagram with time domain separation, no xIFS and sounding after the data frame(s)

FIG. 9 shows an example multi-user procedure 900 a diagram with time domain separation, no xIFS and sounding before the data frame(s). Each WTRU (WTRU1-WTRU4) may send its own sounding packets $906_1$-$906_4$ across the entire frequency band separated in time, and the sounding signals $906_1$-$906_4$ may be sent before the data packet $904_1$-$904_4$, including preambles $902_1$-$902_4$, which are transmitted in an UL MU transmission.

Figure 10:
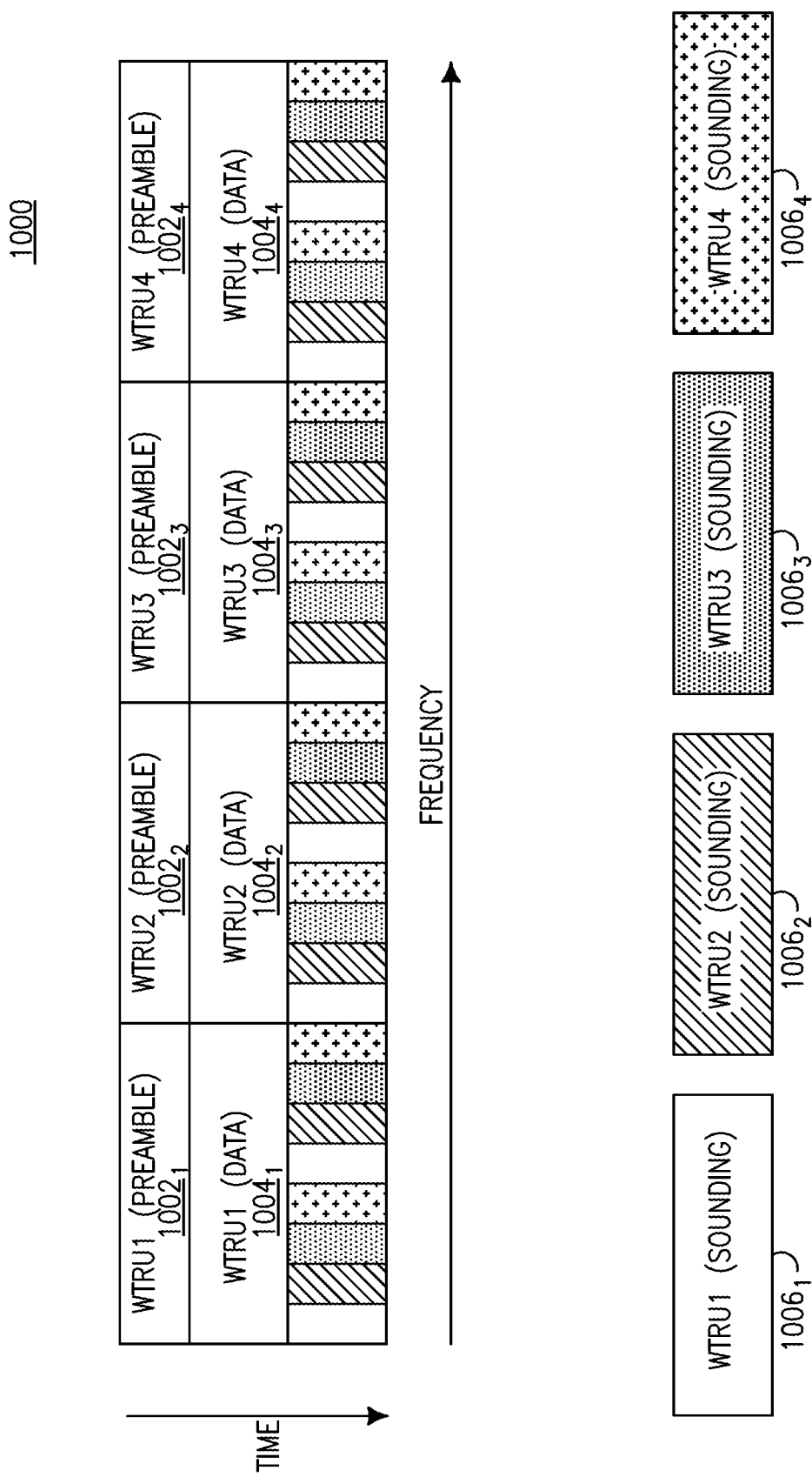
FIG. 10 shows an example frequency-interleaved multi-user sounding procedure 1000 with no xIFS and sounding after the data frame(s)

FIG. 10 shows an example frequency-interleaved multi-user sounding procedure 1000 with no xIFS and sounding after the data frame(s). A subset of the WTRUs (e.g., WTRU1-WTRU4) may simultaneously send their sounding signals $1006_1$-$1006_4$ across the frequency band separated and/or interleaved in frequency. Sounding signals $1006_1$-$1006_4$ may be transmitted after transmission of data frames $1004_1$-$1004_4$, including preambles $1002_1$-$1002_4$ with no xIFS between the sounding signals $1006_1$-$1006_4$.

Figure 11:
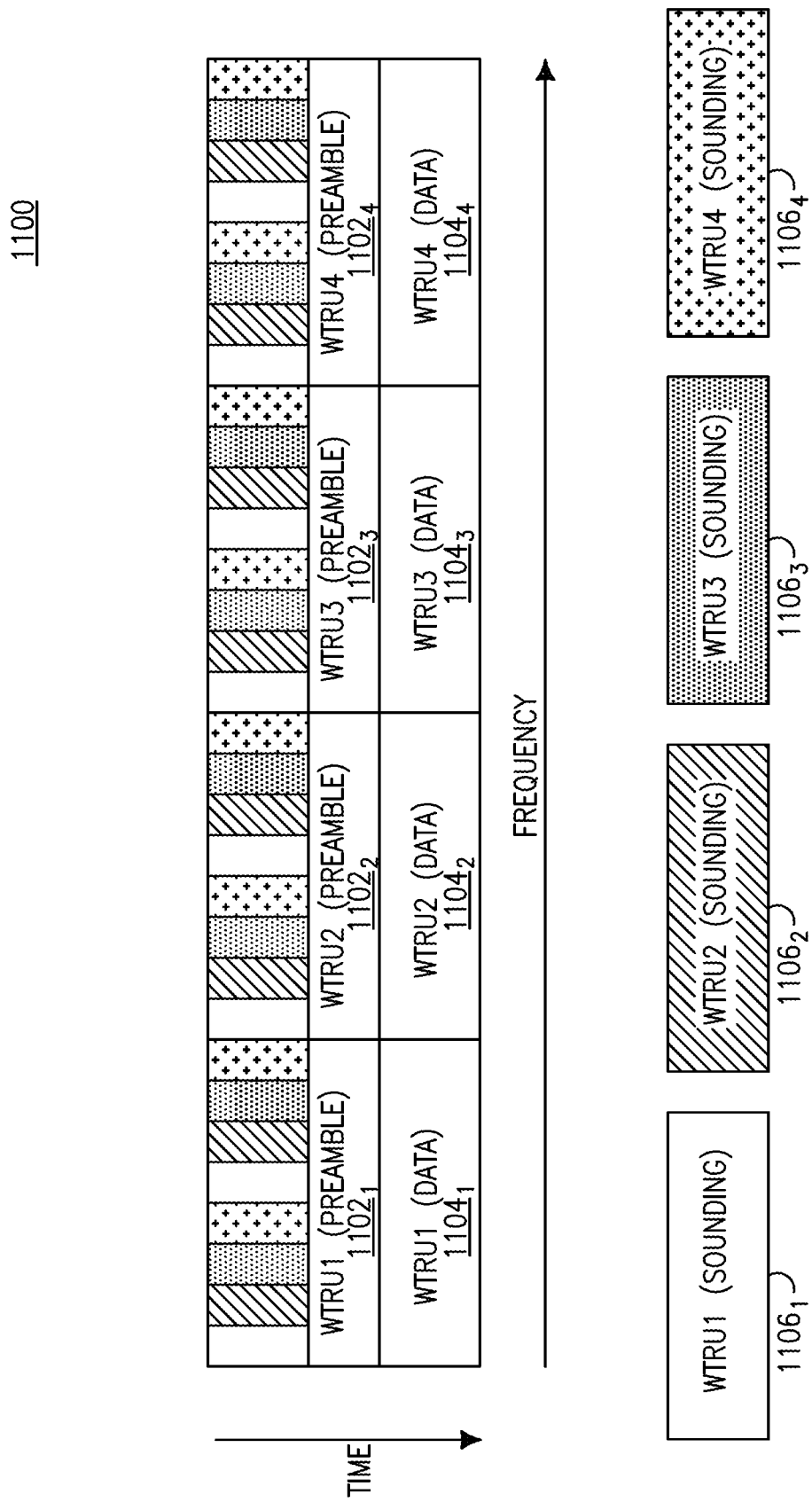
FIG. 11 shows an example frequency-interleaved multi-user sounding procedure with no xIFS and sounding before the data frame(s)

FIG. 11 shows an example frequency-interleaved multi-user sounding procedure 1100 with no xIFS and sounding before the data frame(s). A subset of the WTRUs (e.g. WTRU1-WTRU4) may simultaneously send their sounding signals $1106_1$-$1106_4$ across the frequency band separated and/or interleaved in frequency. Sounding signals $1106_1$-$1106_4$ may be transmitted before transmission of data frames $1104_1$-$1104_4$, including preambles $1102_1$-$1102_4$ with no xIFS between the sounding signals $1106_1$-$1106_4$.

In the examples of FIGS. 10 and 11, the AP may interpolate the received signal from each WTRU to estimate the entire channel, and time and frequency synchronization may be important. In the cases where there is no xIFS between the sounding packets and data packets, the overall transmit power of the sounding signal may be similar to that of the data packets, which may minimize sounding overhead and may prevent rapid AGC changes.

Figure 12:
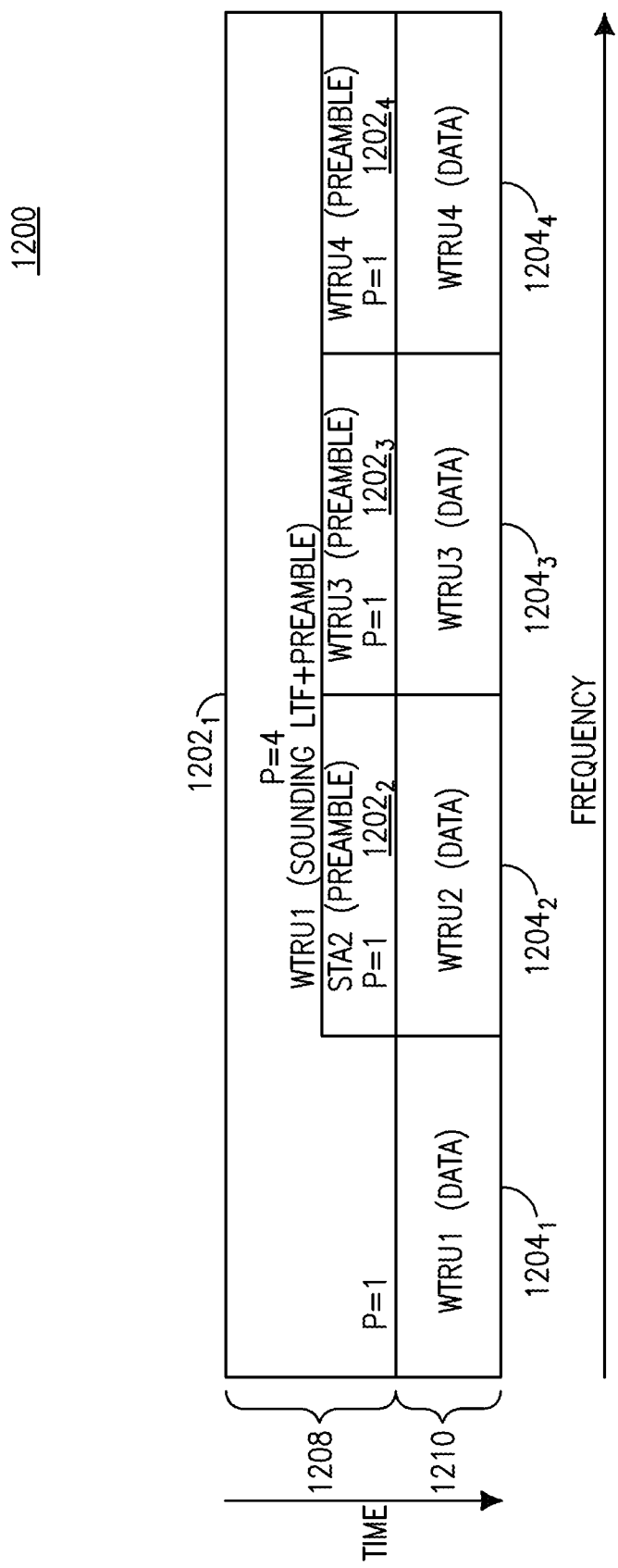
FIG. 12 shows an example multi-user (MU) sounding procedure using joint sounding and preamble transmission.

FIG. 12 shows an example multi-user sounding procedure 1200 using joint sounding and preamble transmission. A sounding LTF+preamble $1202_1$ may be sent from a WTRU (in this example, WTRU1) instead of normal/legacy LTF+preamble. The selected WTRU(s) (e.g. WTRU1) may send the sounding LTF+preamble $1202_1$ across the entire frequency band and may not send a normal/legacy LTF. The LTFs transmitted in preambles $1202_1$-$1202_4$ may be separated from each other by a code (such as a Walsh code, for example) or by using the P-matrix method, such as the P-matrix method for MU-MIMO in 802.11ac. The preambles+LTFs $1202_1$-$1202_4$ may be transmitted before data packets $1204_1$-$1204_4$. In the example of FIG. 12, the transmit power of the sounding LTF+preamble $1202_1$ may be selected such that the total transmit power of the sounding OFDM symbol 1209 may be the same as the data OFDM symbol 1210. For example, the energy in the sounding symbol 1208 may be set equivalent to P=4 so that the energy in the data band 1210 equivalent to P=1. What is depicted in FIG. 12 is exemplary, and any of WTRU1-4 may be configured to transmit a sounding LTF+preamble.

Figure 13:
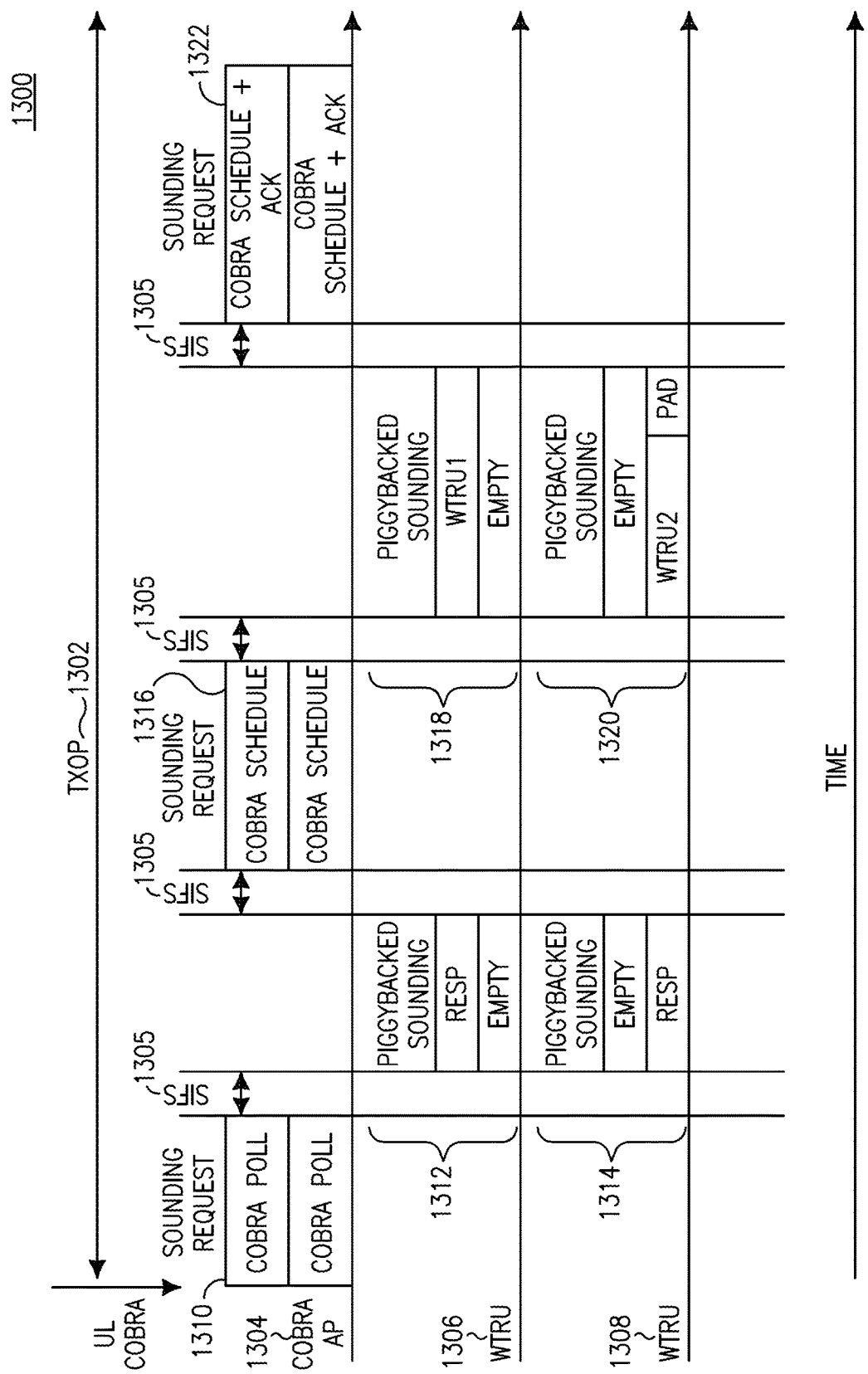
FIG. 13 is a signaling diagram of an example Coordinated Orthogonal Block-based Resource Allocation (COBRA) transmission procedure with sounding.
Figure 14:
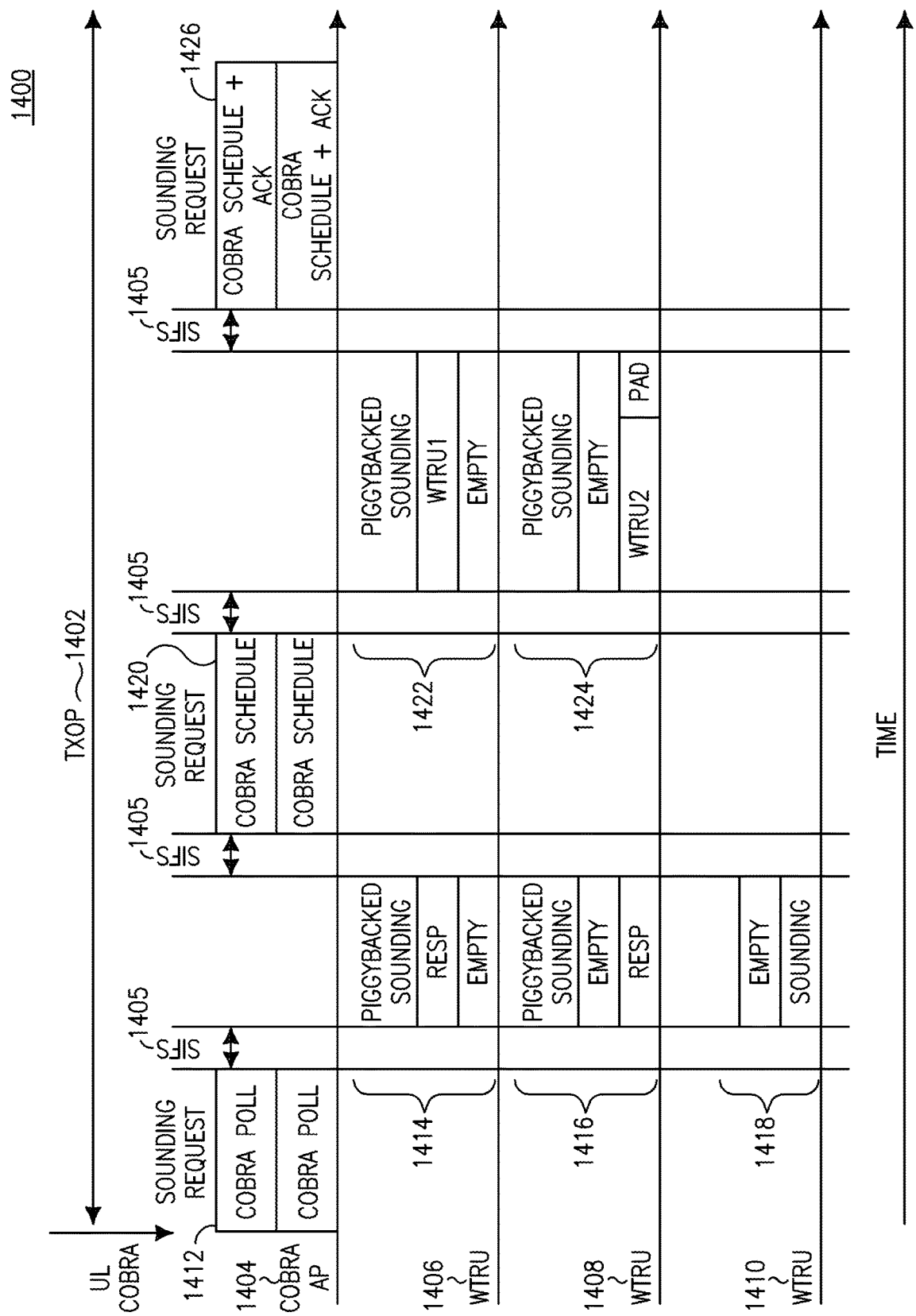
FIG. 14 is a signaling diagram of another example COBRA transmission procedure with sounding.

Procedures for transmitting sounding signals with COBRA channel access schemes are described in the following. The following procedures may be used for a group of WTRUs that have been scheduled or identified for multi-user communications. In the examples of FIGS. 13 and 14, the entire channel bandwidth is divided into sub-channels for COBRA transmission, such that each WTRU may be assigned one or more sub-channels. A sub-channel that is not used by a WTRU during its transmission is labeled as "EMPTY".

FIG. 13 is a signaling diagram of an example COBRA transmission procedure 1300 with sounding. The example system shown in FIG. 13 includes a COBRA AP 1304, WTRUs 1306 and 1308, and signal transmissions may occur over transmission opportunity (TXOP) 1302. Transmissions of frames may be separated by SIFS 1305, or any other type of inter-frame spacing. The COBRA AP 1304 may transmit COBRA poll frame 1310 in order to perform a COBRA polling of WTRUs 1306 and 1308 that may belong to the group of WTRUs to determine which WTRUs have data to send. In the COBRA poll frame 1310, the AP 1304 may request sounding from WTRUs. WTRUs 1306 and 1308 may respond to the AP by sending a COBRA response frame 1312 and 1314, respectively, which may include a sounding frame, for example by piggybacking the sounding signal on the response frame 1312 and 1314. As described above, each WTRU 1306 and 1308, may transmit on its assigned sub-channel(s) (sub-channels not used by a WTRU are labeled "EMPTY"). The AP 1304 may perform measurements based on the received sounding frames 1312 and 1314, for example the received signal strength indication (RSSI), of the different bands for each WTRU 1306 and 1308. The measured RSSI may be for improved WTRU sub-channel selection, as discussed further below.

The AP 1304 may resume normal COBRA transmission, such as COBRA schedule frame 1316 and 1322. If information is needed from more WTRUs, the AP may schedule additional sounding by including a sounding request, for example in the COBRA schedule frame 1316. In response, the WTRUs 1306 and 1308 may piggyback the sounding information on the data transmissions 1318 and 1320, respectively. The WTRUs 1306 and 1308 may respond by sending data frames 1318 and 1320, respectively, such that sounding information may be piggybacked onto the data frames 1318 and 1320. The AP 1304 may send a further COBRA scheduling frame 1322, and may include acknowledgement (ACK) of the received data frames 1318 and 1320 in the COBRA scheduling frame 1322.

FIG. 14 is a signaling diagram of another example COBRA transmission procedure 1400 with sounding. The example system shown in FIG. 14 includes a COBRA AP 1404, WTRUs 1406, 1408, and 1410, and signal transmissions may occur over transmission opportunity (TXOP) 1302. Transmissions of frames may be separated by SIFS 1405, or any other type of inter-frame spacing. The COBRA AP 1404 may transmit COBRA poll frame 1412 in order to perform a COBRA polling of WTRUs 1406, 1408 and 1410, which may belong to the group of WTRUs to determine which WTRUs have data to send. In the COBRA poll frame 1412, the AP 1404 may request sounding from WTRUs not in the group (e.g. WTRU 1410) or may request sounding on a subset of the available sub-channels.

WTRUs 1406 and 1408 may respond to the AP by sending a COBRA response frame 1414 and 1416, respectively, which may include a sounding frame, for example by piggybacking the sounding signal on the response frame 1414 and 1416. As described above, each WTRU 1406, 1408, 1410 may transmit on its assigned sub-channel(s) (sub-channels not used by a WTRU are labeled "EMPTY"). The WTRU 1410 may respond with a sounding frame 1418. The AP 1404 may perform measurements based on the received response frames with sounding and/or sounding frames 1414, 1416, and 1418, for example the RSSI of the different bands for each WTRU 1406, 1408, and 1410. The measured RSSI may be for improved WTRU sub-channel selection, as discussed further below.

The AP 1404 may resume normal COBRA transmission, such as COBRA schedule frame 1420 and 1426. If information is needed from more WTRUs, the AP may schedule additional sounding by including a sounding request, for example in the COBRA schedule frame 1420. In response, the WTRUs 1406 and 1408 may piggyback the sounding information on the data transmissions 1422 and 1424, respectively. The WTRUs 1406 and 1408 may respond by sending data frames 1422 and 1424, respectively, such that sounding information may be piggybacked onto the data frames 1422 and 1424. The AP 1404 may send a further COBRA scheduling frame 1426, and may include acknowledgement (ACK) of the received data frames 1422 and 1424 in the COBRA scheduling frame 1426.

In the examples of FIGS. 13 and 14, there are two groups of WTRUs: a sounding group, and a COBRA data transmission group. In the example of FIG. 13, the two groups are identical and include WTRU 1306 and WTRU 1308. In the example of FIG. 14, the sounding group has WTRUs 1406, 1408 and 1410, while the COBRA transmission group has 1406 and 1408.

According to an embodiment, procedures may manage multi-user sounding capabilities. The WTRUs and APs may indicate their capabilities and preferences for COBRA multi-user sounding for COBRA transmissions and/or receptions. For example, an AP may include in its beacon, Probe Response and/or any other type of frame an indicator that the AP is capable of COBRA multi-user sounding. In another example, a WTRU may include in its Association Request, Probe Request, and/or any other type of frames an indicator that the WTRU is capable of COBRA multi-user sounding.

A design of the multi-user sounding capability fields may include, but is not limited to, transmit sounding capabilities such as: the capability of transmitting piggybacked sounding; the capability of transmitting interleaved sounding sequence; and/or the capability of transmitting sounding signal with (or without) inter-frame space. A design of the multi-user sounding capability fields may include, but is not limited to, receive sounding capabilities such as: the capability of receiving piggybacked sounding; the capability of receiving interleaved sounding sequence; and/or the capability of receiving sounding signal with (or without) inter-frame space.

Figure 15:
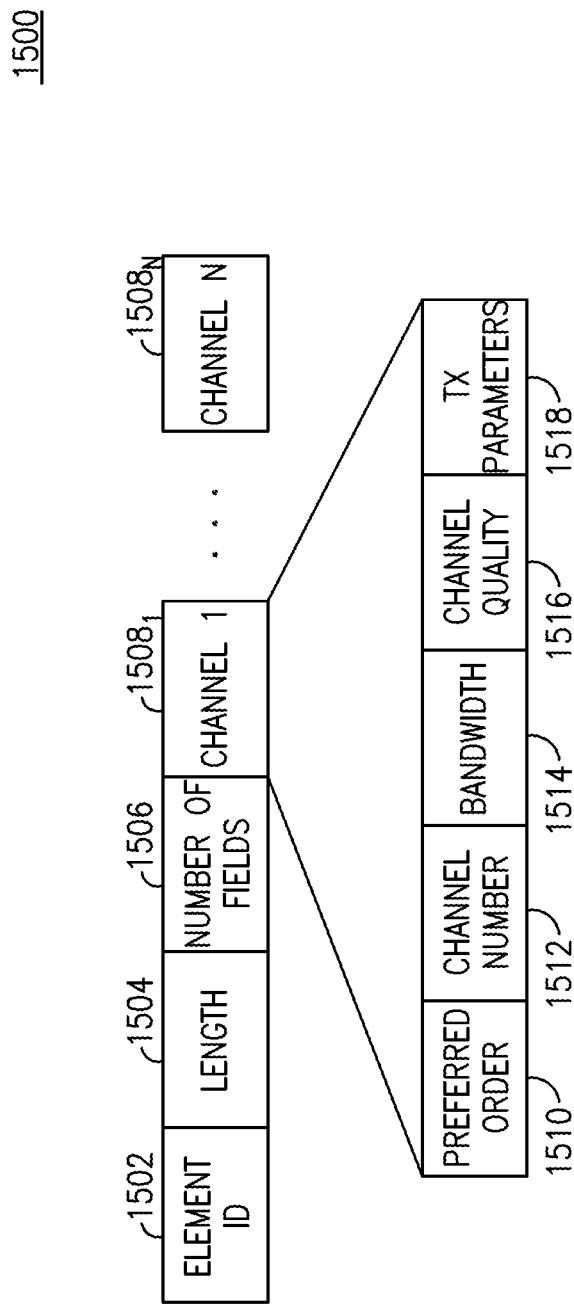
FIG. 15 is a diagram of an example channel preference element.

In accordance with an embodiment, channel preference indication procedure may be used as part of multi-user sub-channel selection. A WTRU may use a channel preference element to indicate that preferred channels or sub-channels. FIG. 15 is a diagram of an example channel preference element 1500, which may be included in a data transmission frame from a WTRU, for example. The channel preference element may include, but is not limited to, any of the following fields: element identification (ID) field 1502; length field 1504; number of fields field 1506; and/or preferred channel field 1508$_1$-1508$_N$.

The element ID field 1502 may include an identifier (ID) to identify that the current element is a channel preference element 1500. The length field 1504 may indicate the length of the channel preference element 1500. The number of fields field 1506 may indicate the number of channel preference fields that are in the channel preference element 1500. This field may be omitted, for example, if a predefined number of channel preference fields are included per channel preference element 1500. Each preferred channel field 1508$_1$-1508$_N$ may specify a preferred channel and the parameters associated with the preferred channel. Each preferred channel field 1508$_1$-1508$_N$ may include, but is not limited to, any of the following subfields: a preferred order subfield 1510; a channel number subfield 1512; a bandwidth subfield 1514; a channel quality subfield 1516; and/or a transmission parameters subfield 1518.

The preferred order subfield 1510 may indicate the preferred order of the indicated channel (e.g. one of channel 1 ... N) in the corresponding preferred channel field (e.g. one of 1508$_1$-1508$_N$). For example, if the preferred channel field 1508$_1$ is used to indicate that channel 2 is the most preferred channel by the transmitting WTRU (e.g. channel 2 may have the best channel quality), then the preferred channel field 1508$_1$ indicating channel 2 may contain "1" in the preferred order subfield 1510, or "0" or whichever value is associated with "the best channel" of "most preferred channel." In another example, the preferred order subfield 1510 may implicitly indicate the order of preference. For example, the first preferred channel field 1508$_1$ may be used to indicate the most preferred channel; the second preferred channel field 1508$_2$ may be used to indicate the second most preferred channel, etc. In that case, the preferred order subfield 1510 may be omitted.

In another example, the preferred order subfield 1510 may be implicitly indicated by the channel quality subfield 1516. The most preferred channel may be the channel that has the best channel quality. In that case, the preferred order subfield 1510 may be omitted.

The channel number subfield 1512 may indicate the channel number of the preferred channel indicated using the corresponding preferred channel field (e.g. one of 1508$_1$-1508$_N$). The channel number subfield 1512 may indicate a channel of any bandwidth, such as channel of bandwidth of 1 MHz, 2 MHz, 4 MHz, 6 MHz, 8 MHz, 10 MHz, 12 MHz, 16 MHz, 20 MHz, 40 MHz, 80 MHz, 160 MHz, or 80+80 MHz, for example. The channel number subfield 1512 may indicate a collection of subcarriers, or resource blocks. The channel number subfield 1512 may be implemented as a bitmap, with a "1" indicating some part of the bandwidth or subcarriers are part of the preferred channels.

The bandwidth subfield 1514 may be used to indicate the bandwidth of the preferred channel. The bandwidth subfield 1514 may be implemented as integers or any other type of indications. The bandwidth subfield 1514 may indicate the total bandwidth of all subcarriers and/or resource blocks included in the preferred channel field 1508$_1$. Some example bandwidth may include bandwidth of 1 MHz, 2 MHz, 4 MHz, 6 MHz, 8 MHz, 10 MHz, 12 MHz, 16 MHz, 20 MHz, 40 MHz, 80 MHz, 160 MHz, or 80+80 MHz.

The channel quality subfield 1516 may provide an indication of the channel quality for the preferred channel. The channel quality subfield 1516 may include, but is not limited to, any of the following information: channel quality indication (CQI), uncompressed channel feedback, compressed channel feedback, RSSI, received channel power indicator (RCPI), signal-to-interference-plus-noise ratio (SINR), mean signal-to-noise ratio (SNR), mean SINR, channel capacity index calculated according to Shannon equations, and/or mean of post-processed SINR.

In another example, the channel quality may be indicated using a pre-determined scale. For example, channel quality may be indicated using an integer from 0-N where N may be 127 or 255. Value "0" may be used to indicate the worst channel quality or least preferred channel, and value "N" may be used to indicate the best channel quality or highest preference. Alternatively, "0" or "N" may be used to indicate an unspecified channel quality. In another example, there may be a channel quality threshold specified by the AP or the WTRU. The transmitting WTRU of the channel preferred element 1500 may only include preferred channels that have channel qualities above the channel quality threshold. The transmitting WTRU may include a channel quality threshold field (not shown) in the channel preference element 1500 in addition to or in place of the channel quality subfield 1516 in each of the preferred channel fields $1508_1$-$1508_N$.

The transmission (TX) parameters subfield 1518 may include mandatory or recommended TX parameters for the receiving WTRU to use on the current preferred channel when the receiving WTRU is transmitting to the WTRU transmitting the channel preference element 1500. The TX parameters subfield 1518 may include, but is not limited to, any of the following parameters: option parameter; MCS parameter; number of spatial streams (Nss) parameter; transmit power parameter; and/or receive clear channel assessment (CCA) level parameter. An option parameter may indicate whether the TX parameters provided in the TX parameters subfield 1518 is optional or mandatory when transmitting to the WTRU that sent the channel preference element 1500 on the current preferred channel. An MCS parameter may indicate the MCS that may be used on the preferred channel. An Nss parameter may indicate the number of spatial streams that should be used on the preferred channel and/or the associated steering matrices.

A transmit power parameter may indicate the transmit power that should be used when transmitting on the preferred channel. The transmit power may be specified using a positive or negative value indicating that when transmitting on the preferred channel, the transmit power should be increased or decreased from a reference transmit power level. The reference transmit power level may be a pre-defined value or the transmit power level used to transmit the sounding or beacon frames or any other frames. There may be an explicit reference to a sounding frame(s), for example. A receive CCA level parameter may provide an indication of the CCA level that the transmitting WTRU sets when operating on the preferred channel.

The Channel Preference element 1500 or any subset of the subfields thereof may be implemented as a subfield or subsets of subfields of any existing or new information element (IE), very high throughput (VHT)/high efficiency WLAN (HEW)/very high spectral efficiency (VHSE) capability element, VHT/HEW/VHSE extended capability element, and/or as a part of any control frame, management frame, extension frames or MAC/PLCP headers, such as the SIG field, frame control field, or as an NDP.

In the following examples, it may be assumed that there are N channels, where a channel may be a contiguous block of frequency bandwidth or may consist of one or more subcarriers or resource blocks, for example. It may also be assumed that channel 1 (e.g. channel $XXXX_1$) is the primary channel of the BSS, where the primary channel may be defined as a channel on which the WTRU and the AP may exchange packets before the channel preference indication.

Figure 16:
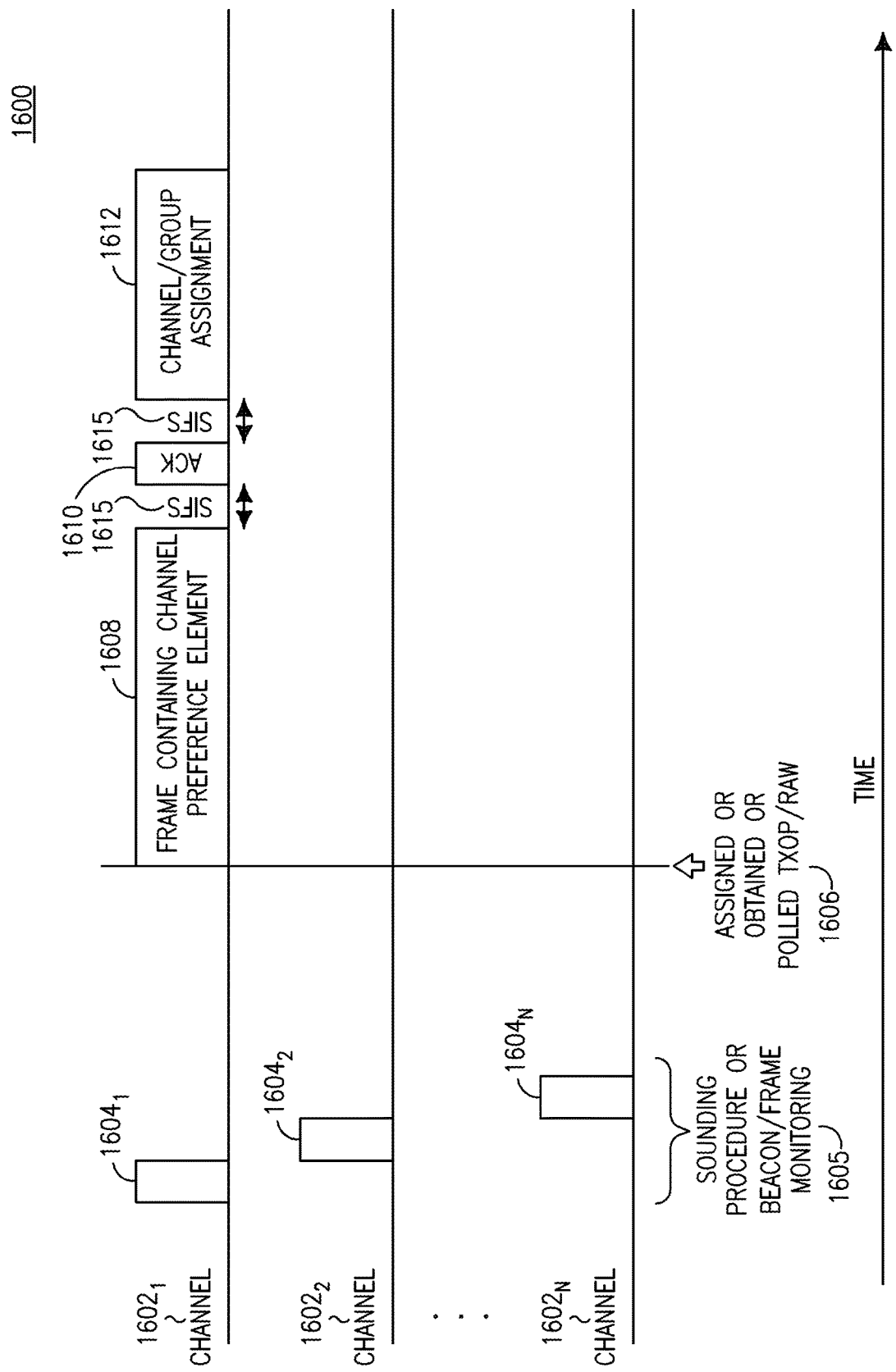
FIG. 16 is a signaling diagram of an example channel preference indication procedure.

FIG. 16 is a signaling diagram of an example channel preference indication procedure 1600. The channels may include channels $1602_1 \ldots 1602_N$, where channel $1602_1$ may be the primary channel. A WTRU may obtain information on channels within the BSS through sounding procedures or monitoring of beacons or other frames $1604_1 \ldots 1604_N$ from the AP, 1605. For example, as part of the sounding procedures, the sequence of frames $1604_1 \ldots 1604_N$ may be beacon frames that may be transmitted on different channels (or sub-channels) sequentially, such that WTRUs (e.g. non-AP STAs) may sound all the channels (or sub-channels). In another example, the sequence of frames $1604_1 \ldots 1604_N$ may be sounding signals that may contain predefined reference signaling that are known at both transmitter and receiver, so the transmitter may transmit the sounding frames on different channels sequentially, and the receiver may sound all the channels.

A WTRU may access the medium and transmit a frame containing its channel preference 1608 to the AP to indicate its preference for the available channels. The WTRU may access the medium and transmit a frame containing its channel preference 1608 to the AP in an UL window 1606, where the AP may have assigned the UL window 1606, such as a restrict access window (RAW).

In other examples, the WTRU may access the medium and transmit a frame containing its channel preference to the AP 1608 in a TXOP 1606 that may be obtained through multiple access procedures such as Carrier Sense Multiple Access (CSMA), Enhanced Distributed Channel Access (EDCA), and/or scheduled MAC access. In another example, the WTRU may access the medium and transmit the frame containing its channel preference to the AP 1608 in a Polled TXOP 1606 in the case that the WTRU has received a channel preference poll from the AP. The WTRU may transmit the frame containing its channel preference to the AP 1608 on the primary channel (channel $1602_1$ in this example) or a channel on which it has established contact with the AP or on its most preferred channel, which may not be the primary channel.

An AP may send an acknowledgement (ACK) or NDP ACK message 1610 to acknowledge the reception of the frame containing its channel preference to the AP 1608. An AP may send a channel and/or group assignment message 1612, which may be sent as a direct response to the frame containing its channel preference to the AP 1608. The SIFS 1615 may or may not be used to separate the message in time.

Figure 17:
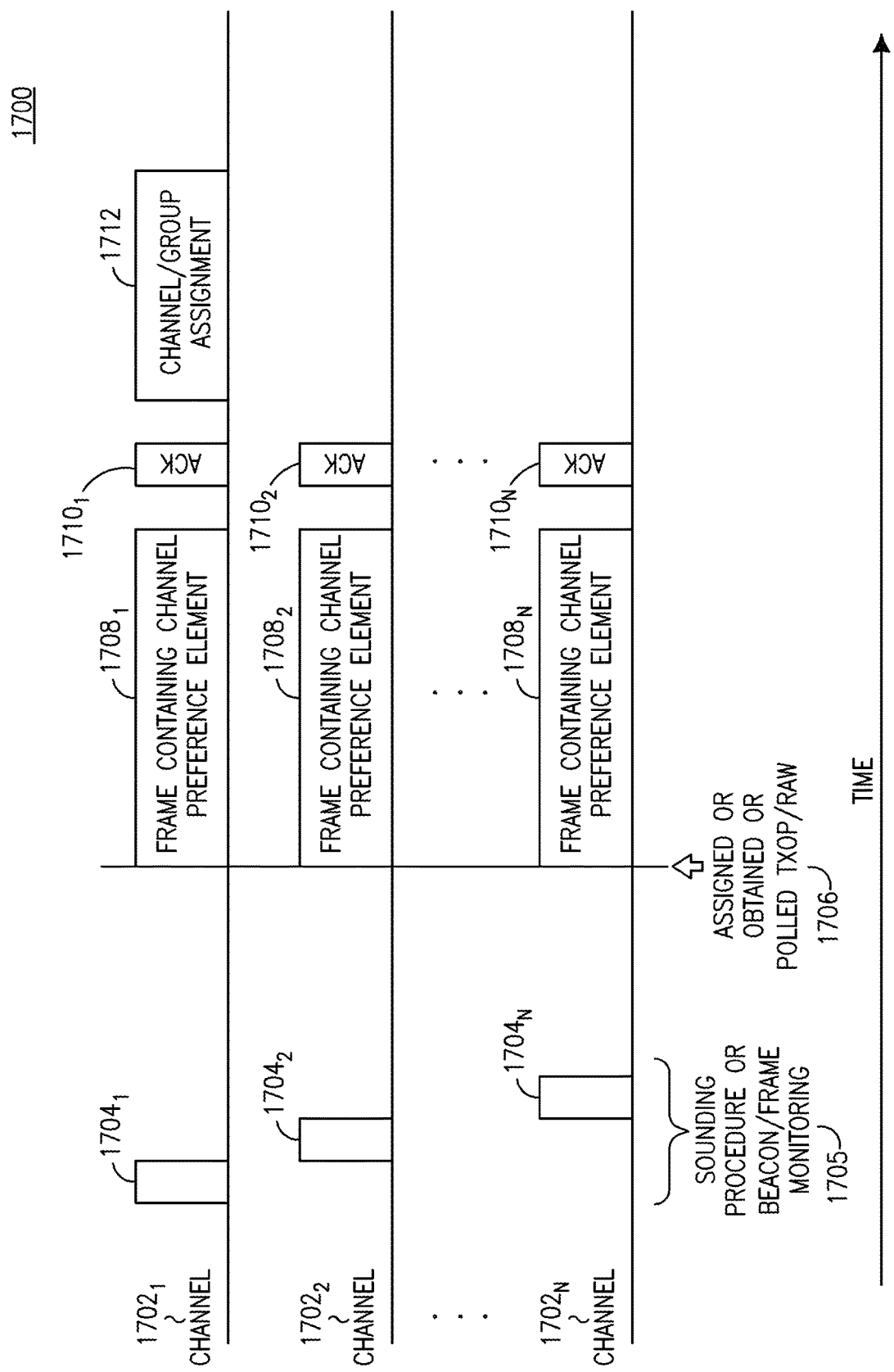
FIG. 17 is a signaling diagram of another example channel preference indication procedure.

FIG. 17 is a signaling diagram of another example channel preference indication procedure 1700. The channels may include channels $1702_1 \ldots 1702_N$, where channel $1702_1$ may be the primary channel. A WTRU may obtain information on channels within the BSS through sounding procedures or monitoring of beacons or other frames $1704_1 \ldots 1704_N$ from the AP, 1705.

The transmitting WTRU may transmit frames containing its channel preference element $1708_1$-$1708_N$ on all available channels $1702_1 \ldots 1702_N$, or on one or more of its preferred channels (e.g. a subset of channels $1702_1 \ldots 1702_N$). The AP may acknowledge the reception of the channel preference by transmitting an ACK or NDP ACK $1710_1 \ldots 1710_N$ on all channels where it has received the channel preference (although all channels are shown, a subset of channels $1702_1 \ldots 1702_N$ may be used). The AP may send channel/group assignment frame 1712 on the primary channel, the WTRU's preferred channel, an assigned channel for the WTRU, or any or all of the available channels $1702_1 \ldots 1702_N$.

Figure 18:
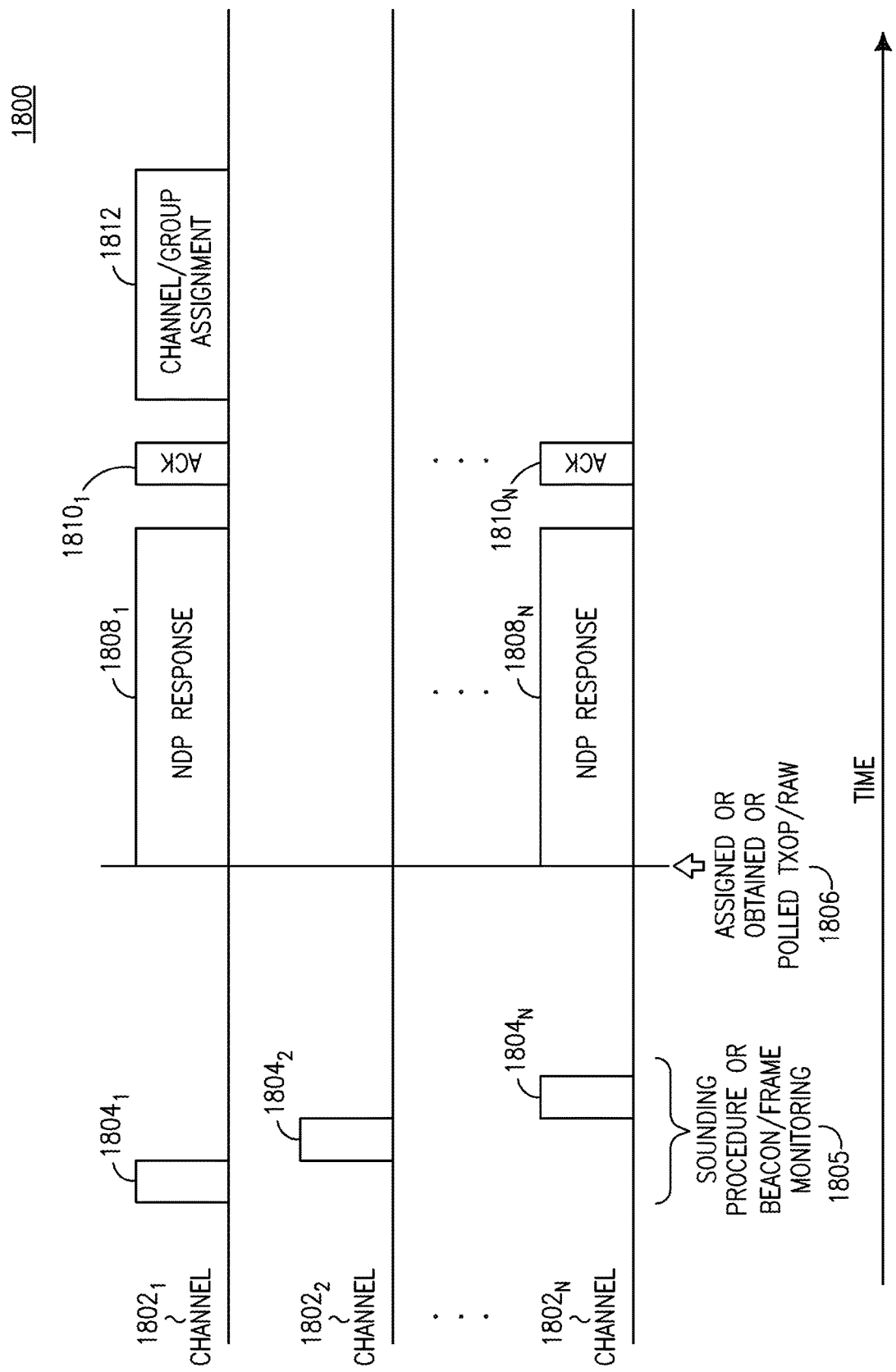
FIG. 18 is a signaling diagram of a third example design of the channel preference indication procedure.

FIG. 18 is a signaling diagram of a third example design of the channel preference indication procedure 1800. The channels may include channels $1802_1 \ldots 1802_N$, where channel $1802_1$ may be the primary channel. A WTRU may obtain information on channels within the BSS through sounding procedures or monitoring of beacons or other frames $1804_1 \ldots 1804_N$ from the AP, 1805.

After obtaining information on the available channels, the WTRU may transmit NDP response frames $1808_1 \ldots 1808_N$ to indicate its channel preference, where the NDP response frames $1808_1 \ldots 1808_N$ may be transmitted during an assigned, obtained, or polled TXOP or RAW 1806.

A WTRU may transmit one or more channel preference (CP) NDP response frame(s) $1808_1 \ldots 1808_N$ on all channels that have a quality higher than some channel quality threshold, where the channel quality threshold may be pre-defined or determined by the AP to indicate that these channels are preferred. A WTRU may transmit a CP NDP response frame(s) $1808_1 \ldots 1808_N$ that contains preference order to indicate the preferred channels. The AP may acknowledge the reception of the CP NDP response frame(s) $1808_1 \ldots 1808_N$ by transmitting an ACK or NDP ACK frame(s) $1810_1 \ldots 1810_N$. The AP may transmit a channel/group assignment frame 1812 at a later point of time, or as a response to the WTRU's channel preference instead of the ACK or NDP ACK frame(s) $1810_1 \ldots 1810_N$.

Figure 19:
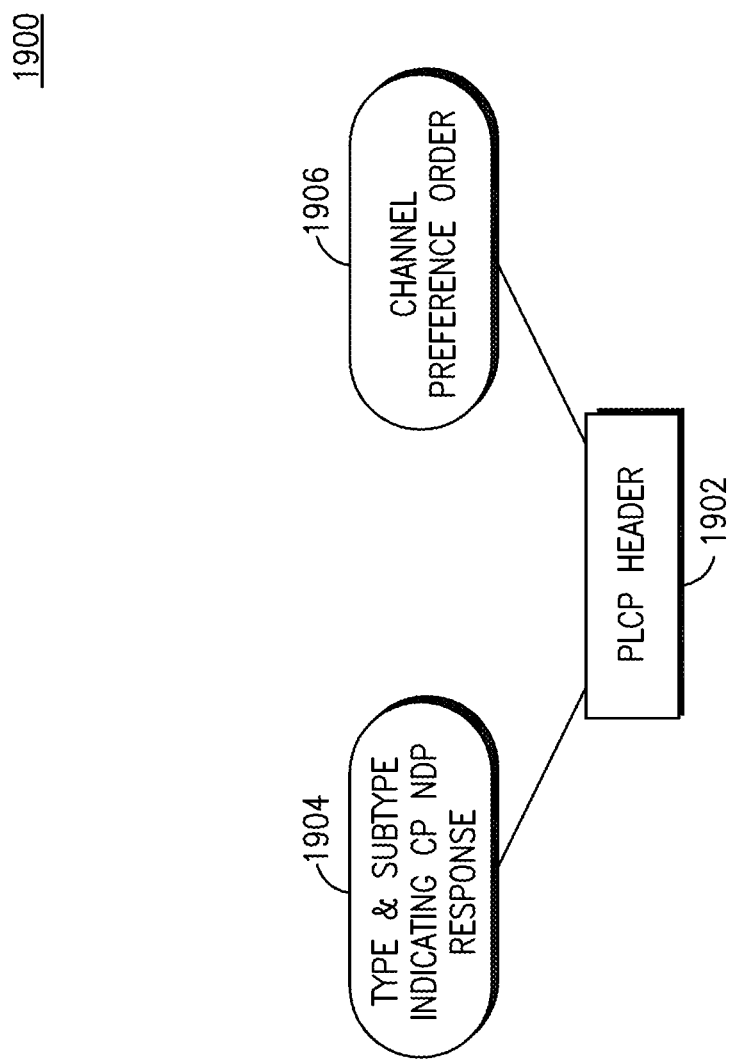
FIG. 19 is a diagram of an example channel preference (CP) null data packet (NDP) response frame.

FIG. 19 is a diagram of an example CP NDP response frame 1900. The CP NDP response may contain an indication 1904 that it is the CP NDP response frame 1900. For example, the combination of the values in the type and subtype field may indicate that the current frame is the CP NDP response frame 1900. The CP NDP response frame 1900 may also contain a channel preference order field 1906 that may indicate the preference order of the channel on which the CP NDP response frame 1900 is transmitted. For example, the CP NDP response frame 1900 transmitted on the preferred channel may contain the value "0" or "1" or some value "N" in the channel preference order field 1906 to indicate that it is the most preferred channel. The indication of CP NDP response 1904 and/or the channel preference order 1906 may be in the PLCP header 1902 of the CP NDP response frame 1900.

Figure 20:
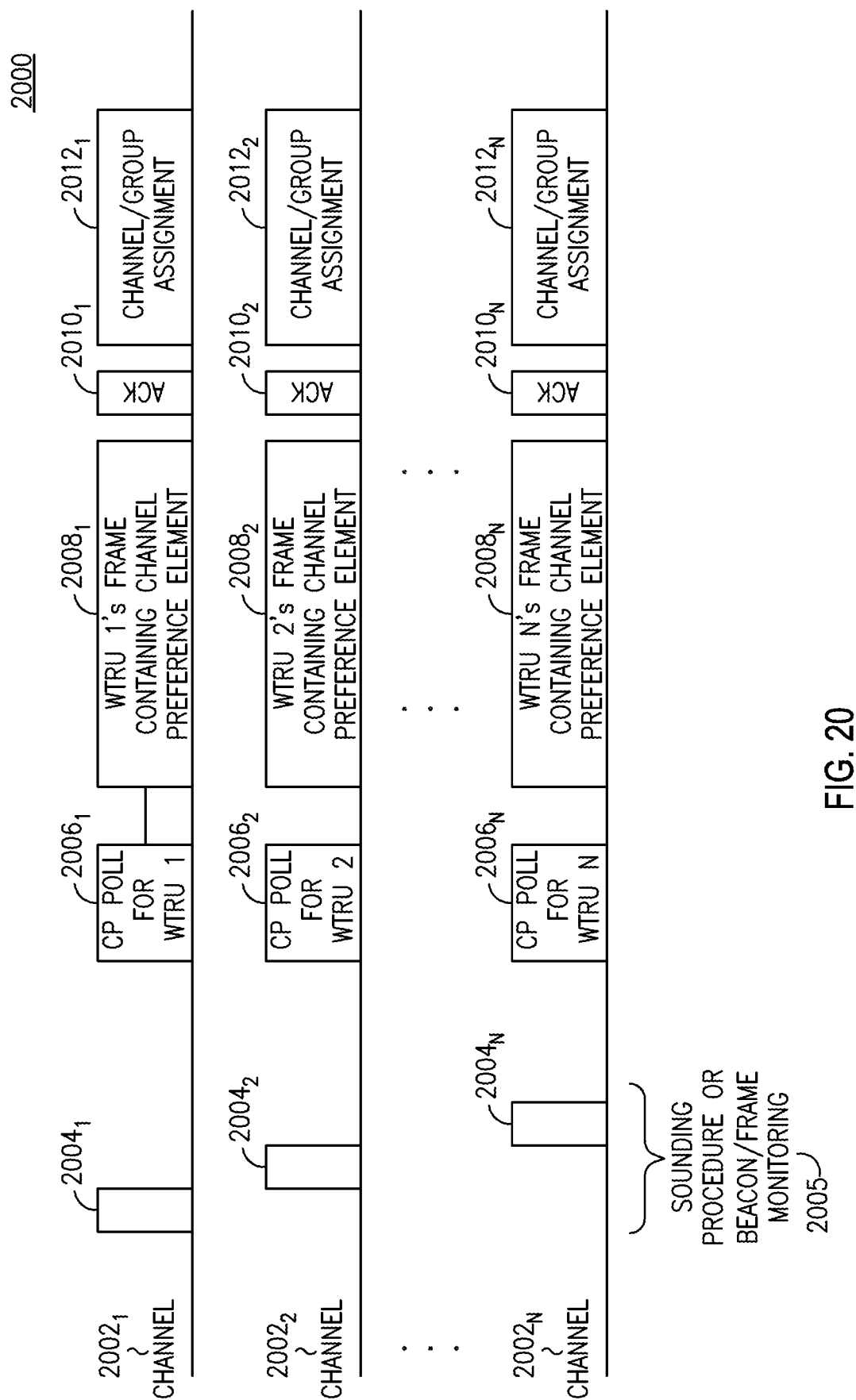
FIG. 20 is a signaling diagram of an example polled channel preference indication procedure.

FIG. 20 is a signaling diagram of an example polled channel preference indication procedure 2000. The channels may include channels $2002_1 \ldots 2002_N$, where channel $2002_1$ may be the primary channel. After the WTRUs have obtained information of the available channels from the sounding procedures or monitoring of the beacons or frames $2004_1 \ldots 2004_N$ from the AP, 2005, the AP may poll some number of WTRUs concurrently by transmitting a channel preference poll (CP Poll) frame $2006_1 \ldots 2006_N$ for each WTRU on one of the channels, respectively. Each WTRU may transmit a frame including a channel preference element $2008_1 \ldots 2008_N$ on the channel on which it has received its respective CP poll frame $2006_1 \ldots 2006_N$ from the AP. The AP may acknowledge the reception of the channel preference by transmitting an ACK message $2010_1 \ldots 2010_N$ on the channel on which it has received the respective frames including a channel preference element $2008_1 \ldots 2008_N$ from the WTRU. The AP may transmit channel/group assignment frame(s) $2012_1 \ldots 2012_N$ at a later point of time, or as a response to the WTRU's channel preference instead of the ACK message $2010_1 \ldots 2010_N$. The AP may transmit the channel/group assignment frame(s) $2012_1 \ldots 2012_N$ on the primary channel, the WTRUs' preferred channel, WTRUs' assigned channels or one or more of the available channels (FIG. 20 shows all channels being used).

Figure 21:
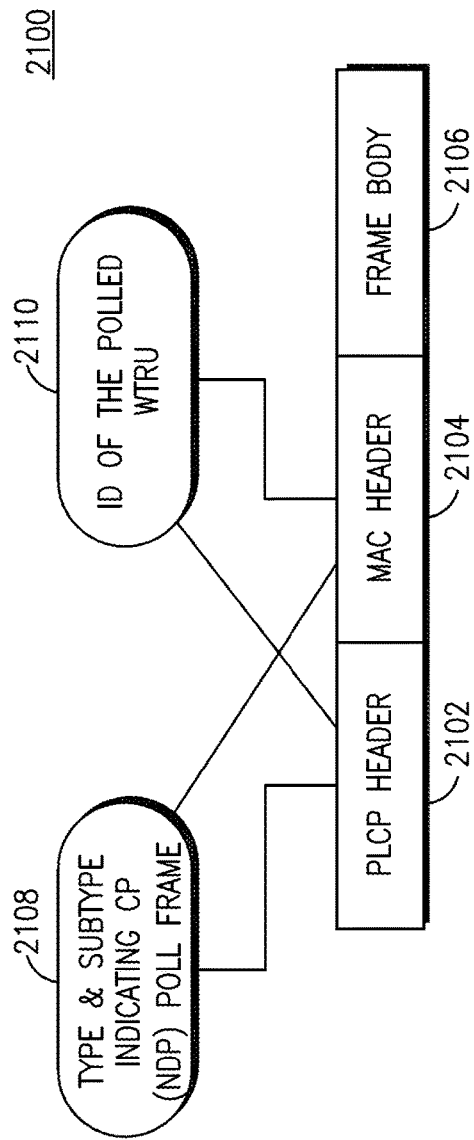
FIG. 21 is a diagram of an example CP (NDP) Poll frame.

FIG. 21 is a diagram of an example CP (NDP) poll frame 2100, which may include a frame body 2106. In the case that the CP Poll frame 2100 is a CP NDP Poll frame, the CP Poll frame 2100 may include a PLCP header 2102. The NDP CP Poll frame 2100 may contain an indication 2108 that it is an NDP CP Poll frame, which may be contained in the PLCP header 2102. For example, the combination of values in the type and subtype fields in the CP poll frame 2100 may indicate that it is an NDP CP poll frame. The (NDP) CP poll frame 2100 may also contain the ID 2110 of the WTRU that is being polled, for example, in the PLCP header 2102. The ID 2110 may be implemented as an AID, MAC ID, compressed MAC ID, or any other type of ID.

A CP poll frame 2100 may contain a PLCP header 2102 and/or a MAC header 2104. In this case, the indication 2102 that the CP poll frame 2100 is a CP poll frame may be a combination of values in the type and subtype fields in the MAC header 2104. The ID 2110 of the WTRU that is being polled may be located in in the MAC header 2104, for example. The WTRU ID 2110 may be implemented as an MD, MAC ID, compressed MAC ID, or any other type of ID.

Figure 22:
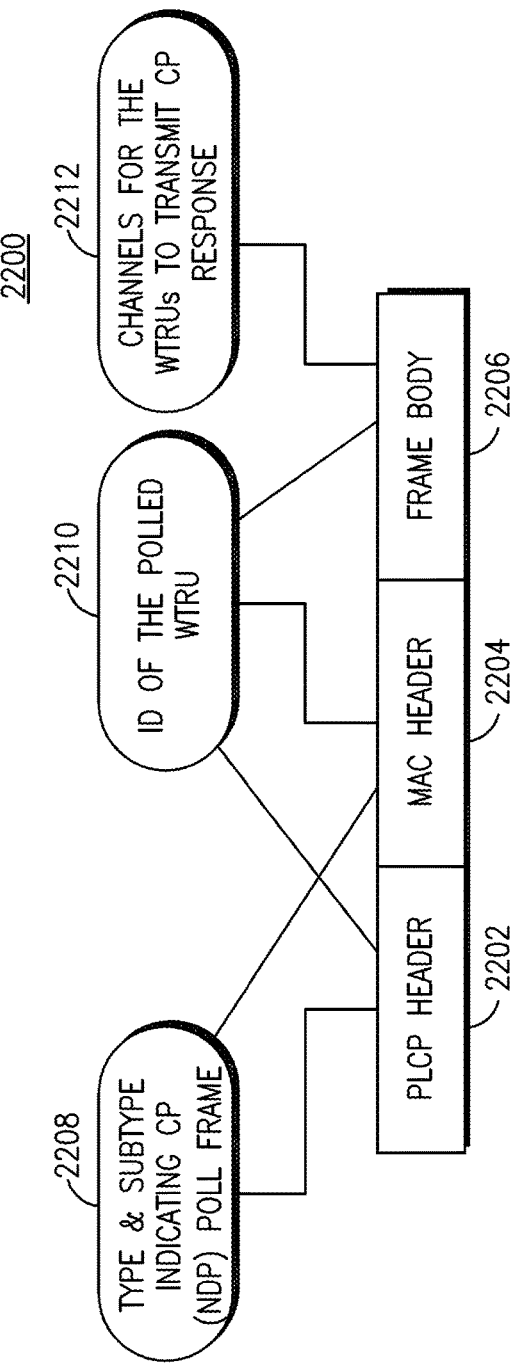
FIG. 22 is a diagram of another example CP (NDP) Poll frame.

FIG. 22 is a diagram of another example CP (NDP) Poll frame 2200. The (NDP) CP Poll frame 2200 may contain an indication 2208 that it is a NDP CP Poll frame. For example, the combination of values in the type and subtype fields in the PLCP header 2202 and/or MAC header 2204 may indicate that the frame is a NDP CP poll frame. The NDP CP poll frame may also contain the IDs 2210 of the WTRUs that are being polled, for example, in the PLCP header 2202 and/or the MAC header 2204. The IDs 2210 may be implemented as AIDs, MAC IDs, compressed MAC IDs, Group IDs, or any other type of IDs. A broadcast address may be contained in the MAC header as random access (RA), and a list of IDs 2210 of polled WTRUs may be included in the frame body 2206. The NDP CP poll frame 2200 may also contain a list of channels 2212 on which each of the polled WTRUs may transmit their channel preference, which may be included in the frame body 2206.

Figure 23:
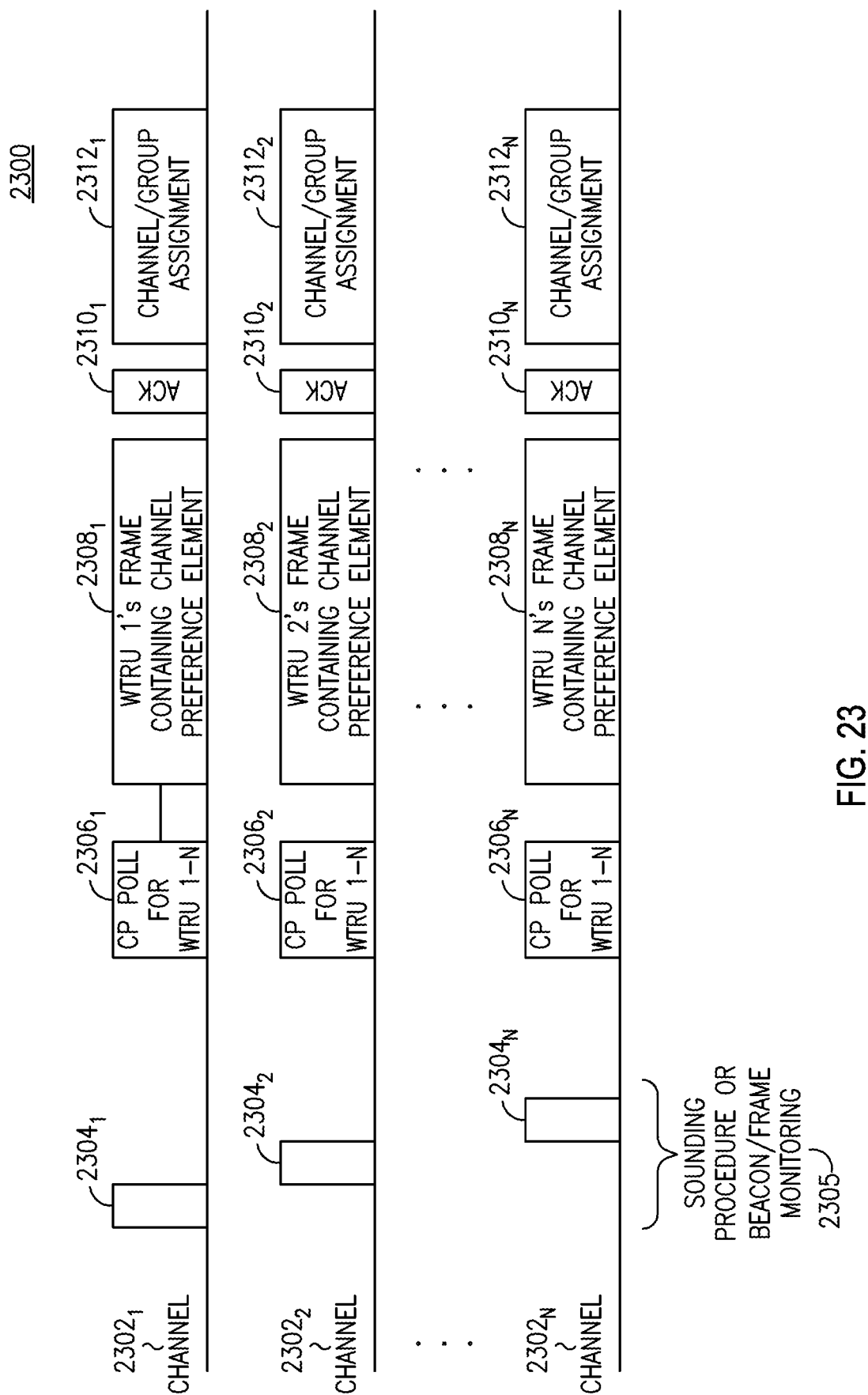
FIG. 23 is a signaling diagram of another example polled channel preference indication procedure.

FIG. 23 is a signaling diagram of another example polled channel preference indication procedure 2300. The channels may include channels $2302_1 \ldots 2302_N$, where channel $2302_1$ may be the primary channel. After the WTRUs have obtained information of the available channels from the sounding procedures or monitoring of the beacons and frames $2304_1 \ldots 2304_N$ from the AP, 2305, the AP may poll some number of WTRUs concurrently by transmitting a CP poll frame $2306_1 \ldots 2306_N$ for one or more of the WTRUs (e.g. WTRUs 1 . . . N, or some subset thereof). The CP poll frame $2306_1 \ldots 2306_N$ may be transmitted on the primary channel, or one or more of available channels concurrently. The CP Poll frame $2306_1 \ldots 2306_N$ may include a list of channels on which each of the polled WTRUs may transmit their channel preference in response to the CP poll frame $2306_1 \ldots 2306_N$.

The polled WTRUs may transmit a frame containing their channel preference $2308_1 \ldots 1208_N$ on the channel specified for each of the polled WTRUs in the CP poll frames $2306_1 \ldots 2306_N$. The AP may acknowledge the reception of the channel preference by transmitting an ACK $2310_1 \ldots 2310_N$ on the same channel on which it has received the WTRU's channel preference. The AP may transmit channel/group assignment frame(s) $2312_1 \ldots 2312_N$ at a later point of time, or as a response to the WTRU's channel preference instead of the ACK message 2310₁ ... 2310_N. The AP may transmit the channel/group assignment frame(s) 2312₁ ... 2312_N on the primary channel, the WTRUs' preferred channel, WTRUs' assigned channels or one or more of the available channels (note that FIG. 23 shows all channels being used).

In the example described above, the channel preference poll frame, response frame, NDP Poll frames or procedures may be in combination or in addition to any other type of feedback procedures. Although the solutions described herein may be described in the context of 802.11 protocols, it is understood that the solutions described herein are not restricted to this scenario and may be applicable to other wireless systems. Although SIFS is used to indicate various inter frame spacing in the examples of the designs and procedures, all other inter frame spacing such as reduced inter-frame spacing (RIFS) or other time interval may be applied in the same solutions.

Figure 24:
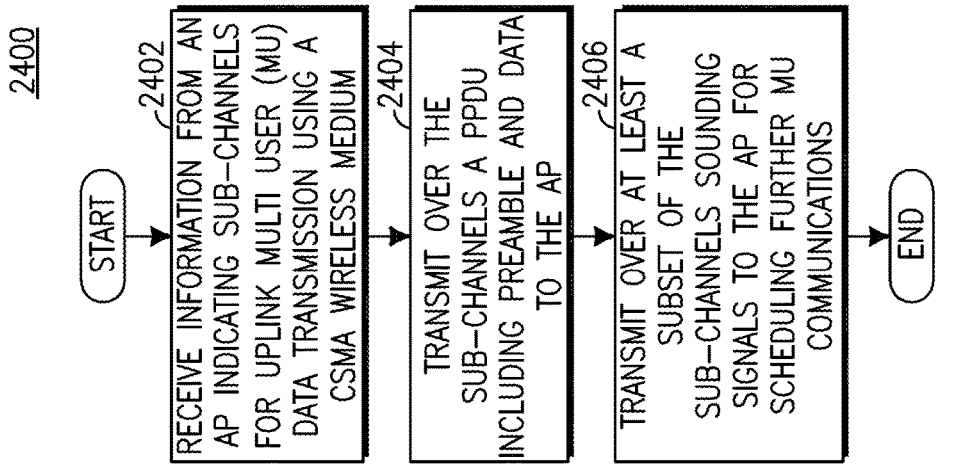
FIG. 24 is a flow diagram of an example uplink MU sounding procedure.

FIG. 24 is a flow diagram of an example uplink MU sounding procedure 2400, which may be performed by a WTRU. Information may be received from an AP that may indicate sub-channels for uplink MU data transmission using a CSMA wireless medium, 2402. A PPDU including a preamble and data may be transmitted over the sub-channels on the uplink to the AP, 2404. Sounding signals may be transmitted over at least a subset of the sub-channels to the AP for scheduling further MU communications.

Figure 25:
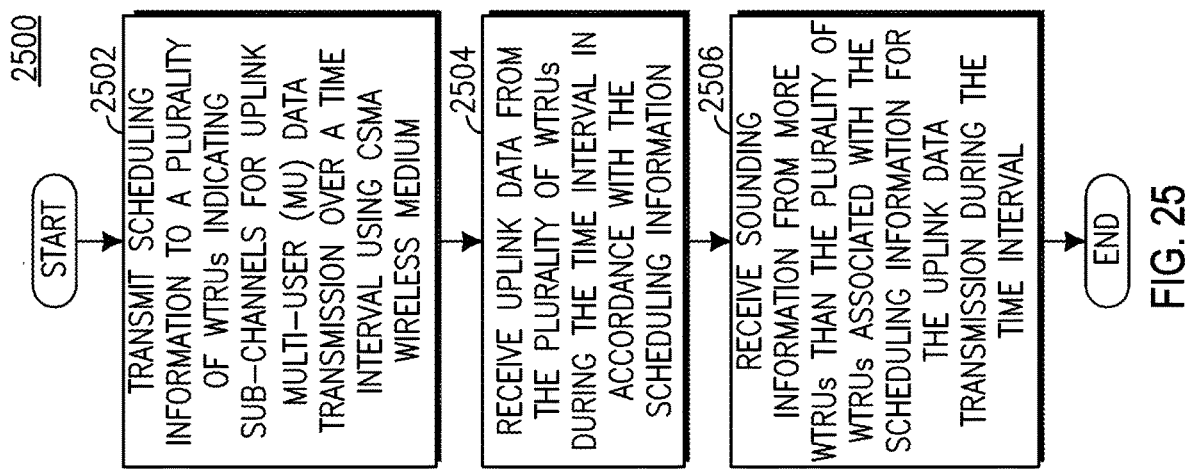
FIG. 25 is a flow diagram of another example uplink MU sounding procedure.

FIG. 25 is a flow diagram of an example uplink MU sounding procedure 2500, which may be performed by an AP. Scheduling information may be transmitted to a plurality of WTRUs, which may indicate sub-channels for uplink MU data transmission over a time interval using a CSMA wireless medium, 2502. Uplink data may be received from the plurality of WTRUs during the time interval in accordance with the scheduling information, 2504. Sounding information may be received from more WTRUs than the plurality if WTRUs associated with the scheduling information for uplink data transmission during the time interval, 2506.

Figure 26:
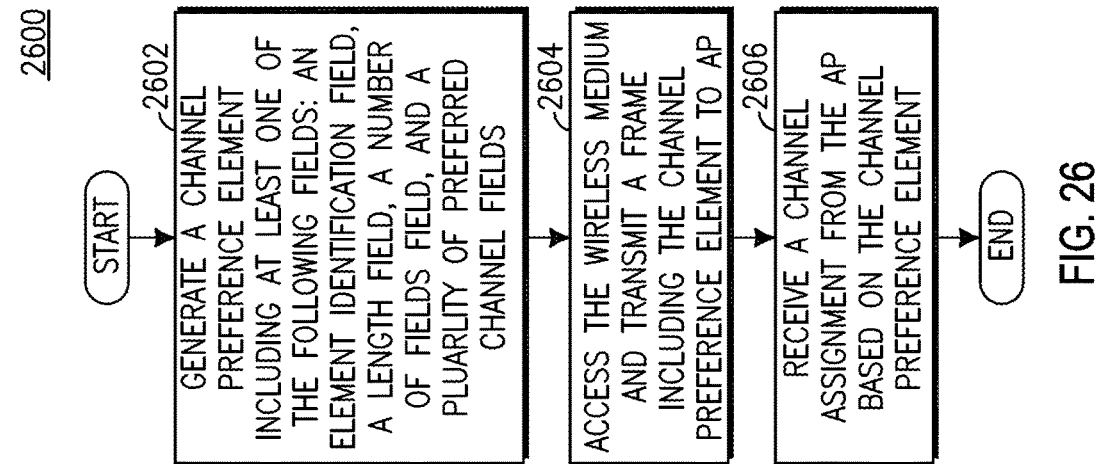
FIG. 26 is a flow diagram of an example sub-channel preference indication procedure for uplink MU data transmission.

FIG. 26 is a flow diagram of an example sub-channel preference indication procedure 2600 for uplink MU data transmission, which may be performed by a WTRU. A channel preference element may be generated, which may including at least one of the following fields: an element identification field, a length field, a number of fields field, and a plurality of preferred channel fields, 2602. The plurality of preferred channel fields may include at least one of the following subfields: a preferred order subfield, a channel number subfield, a bandwidth subfield, a channel quality subfield, and transmission parameters subfield. The WTRU may access the wireless medium and transmit a frame including the channel preference element to an AP, 2604. The WTRU may receive a channel or group assignment from the AP based on the channel preference element, 2606.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
    a receiver configured to receive, from an access point (AP), a null data packet (NDP) announcement frame;
    the receiver configured to receive, from the AP, a NDP sounding frame, subsequent to the NDP announcement frame;
    the receiver configured to receive, from the AP, subsequent to the NDP sounding frame, a polling frame addressed to a broadcast address and sent to a plurality of WTRUs, wherein the polling frame specifies a plurality of association identifiers (AIDS) and the polling frame specifies a plurality of orthogonal frequency division multiple access (OFDMA) resource unit allocations; and
    a transmitter configured to transmit a physical layer convergence protocol data unit (PPDU) indicating signal to noise ratio (SNR) information for a plurality of sub-channels, to the AP, using an OFDMA resource unit allocation of the plurality of OFDMA resource unit allocations, a short interframe spacing (SIFS) after the polling frame is received;
    wherein the transmitter is configured to transmit the PPDU simultaneously with another PPDU transmitted to the AP by another WTRU of the plurality of WTRUs.

2. The WTRU of claim 1, wherein the transmitter is configured to transmit the PPDU during an uplink window assigned by the AP.

3. The WTRU of claim 1, wherein the receiver is further configured to receive an acknowledgment (ACK) from the AP acknowledging receipt of the PPDU.

4. The WTRU of claim 3, wherein the ACK is an NDP ACK.

5. The WTRU of claim 1, wherein the polling frame is a single frame.

6. The WTRU of claim 1, wherein each one of the plurality of orthogonal frequency division multiple access (OFDMA) resource unit allocations corresponds to one of the plurality of AIDS.

7. The WTRU of claim 1, wherein the PPDU is transmitted using multi-user multiple in multiple out (MU-MIMO).

8. A method performed by a wireless transmit/receive unit (WTRU), the method comprising:
    receiving, from an access point (AP), a polling frame addressed to a broadcast address and sent to a plurality of WTRUs, wherein the polling frame specifies a plurality of association identifiers (AIDs) and a plurality of orthogonal frequency division multiple access (OFDMA) resource unit allocations; and
    in response to receiving the polling frame, transmitting a physical layer convergence protocol data unit (PPDU) indicating signal to noise ratio (SNR) information for a plurality of sub-channels, to the AP, using an OFDMA resource unit allocation of the plurality of OFDMA resource unit allocations, a short interframe spacing (SIFS) after receiving the polling frame;
    wherein the transmission of the PPDU occurs simultaneously with another PPDU transmitted by another WTRU of the plurality of WTRUs.

9. The method of claim 8, wherein the transmitting the PPDU is during an uplink window assigned by the AP.

10. The method of claim 8, further comprising:
receiving an acknowledgment (ACK), from the AP, acknowledging receipt of the PPDU.

11. The method of claim 8, wherein each one of the plurality of orthogonal frequency division multiple access (OFDMA) resource unit allocations corresponds to one of the plurality of AIDS.

12. The method of claim 8, wherein the PPDU is transmitted using multi-user multiple in multiple out (MU-MIMO).

13. An access point (AP) comprising:
a transmitter configured to transmit a null data packet (NDP) announcement frame;
the transmitter configured to transmit, an NDP sounding frame, subsequent to the NDP announcement frame;
the transmitter configured to transmit, subsequent to the NDP sounding frame, a polling frame addressed to a broadcast address and sent to a plurality of wireless transmit/receive units (WTRUs), wherein the polling frame specifies a plurality of association identifiers (AIDS) and the polling frame specifies a plurality of orthogonal frequency division multiple access (OFDMA) resource unit allocations; and
a receiver configured to receive physical layer convergence protocol data unit (PPDUs) simultaneously from at least a subset of WTRUs of the plurality of WTRUs, wherein the PPDUs each comprise compressed channel feedback.

14. The AP of claim 13, further comprising:
the transmitter is configured to not transmit an acknowledgement of the simultaneously received PPDUs.

15. The AP of claim 13, wherein the compressed channel feedback is ordered by frequency.

16. The AP of claim 13, wherein each one of the plurality of orthogonal frequency division multiple access (OFDMA) resource unit allocations corresponds to one of the plurality of AIDS.

\* \* \* \* \*